United States Patent
Kikuzuki

(10) Patent No.: US 10,003,421 B2
(45) Date of Patent: Jun. 19, 2018

(54) RADIO ANALYSIS APPARATUS AND METHOD

(71) Applicant: FUJITSU LIMITED, Kawasaki-shi, Kanagawa (JP)

(72) Inventor: Tatsuya Kikuzuki, Sodegaura (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/633,001

(22) Filed: Jun. 26, 2017

(65) Prior Publication Data

US 2018/0048406 A1 Feb. 15, 2018

(30) Foreign Application Priority Data

Aug. 15, 2016 (JP) .................. 2016-159140

(51) Int. Cl.
| | |
|---|---|
| H04L 7/02 | (2006.01) |
| H04B 17/391 | (2015.01) |
| H04B 1/10 | (2006.01) |
| H04B 17/345 | (2015.01) |
| H04B 17/364 | (2015.01) |
| G01S 3/74 | (2006.01) |
| H01Q 3/26 | (2006.01) |
| G01S 3/32 | (2006.01) |

(52) U.S. Cl.
CPC ............ *H04B 17/391* (2015.01); *G01S 3/32* (2013.01); *G01S 3/74* (2013.01); *H01Q 3/26* (2013.01); *H04B 1/1027* (2013.01); *H04B 17/345* (2015.01); *H04B 17/364* (2015.01); *H04L 7/02* (2013.01)

(58) Field of Classification Search
CPC .. H04B 17/391; H04B 17/345; H04B 1/1027; H04B 17/364; H01Q 3/26; G01S 3/32; G01S 3/74; H04L 7/02
See application file for complete search history.

(56) References Cited

U.S. PATENT DOCUMENTS

| | | | |
|---|---|---|---|
| 6,934,342 B1 | 8/2005 | Ishii et al. | |
| 2004/0008755 A1* | 1/2004 | Byun | ........... H04L 27/1563 375/130 |
| 2007/0076344 A1* | 4/2007 | Hamaishi | ......... H01J 37/32522 361/225 |

(Continued)

FOREIGN PATENT DOCUMENTS

| | | |
|---|---|---|
| JP | 09-172464 | 6/1997 |
| JP | 2001-086171 | 3/2001 |

(Continued)

*Primary Examiner* — Jean B Corrielus
(74) *Attorney, Agent, or Firm* — Fujitsu Patent Center

(57) ABSTRACT

A radio analysis apparatus includes: a processor that calculates a modulation index of a radio signal generated by performing frequency shift keying on a baseband signal, based on phase shift amounts of the radio signal; and a memory that holds information in which bit patterns of the baseband signal are associated with correction values for correcting the phase shift amounts that have dropped by band limitation on the baseband signal. The processor restores the bit patterns of the baseband signal based on the phase shift amounts of the radio signal, corrects the phase shift amounts of the radio signal by using the correction values corresponding to the restored bit patterns, and calculates the modulation index based on the corrected phase shift amounts.

6 Claims, 20 Drawing Sheets

(56) References Cited

U.S. PATENT DOCUMENTS

2014/0064402 A1* 3/2014 Kim .................. H04L 27/38
                                                        375/273

FOREIGN PATENT DOCUMENTS

| JP | 2001-512928 | 8/2001 |
| JP | 2003-023467 | 1/2003 |
| WO | 99/07119 | 2/1999 |

* cited by examiner

RADIO ANALYSIS APPARATUS AND METHOD

CROSS-REFERENCE TO RELATED APPLICATION

This application is based upon and claims the benefit of priority of the prior Japanese Patent Application No. 2016-159140, filed on Aug. 15, 2016, the entire contents of which are incorporated herein by reference.

FIELD

The embodiments discussed herein relate to a radio analysis apparatus and a radio analysis method.

BACKGROUND

When radio communication is performed, presence of an interference radio wave is a cause of deterioration of the communication quality. Thus, countermeasures against the interference of the target radio wave are taken by monitoring the state of the radio wave interference. Examples of the countermeasures against the interference include controlling the output of a radio wave and changing the installation location of an apparatus outputting a radio wave. Effective countermeasures vary depending on the characteristics of the interference radio wave.

The characteristics of a radio wave depend on the specification defined by the corresponding radio standard, such as parameters used for the modulation or the method of controlling the radio wave. Thus, if the radio standards of radio waves being transmitted through the air are detected, it is expected that the interference of the target radio wave is effectively reduced. However, even if a radio wave is received and data is restored, there are cases in which the radio standard fails to be determined in detail from the data.

For example, it is difficult to distinguish Bluetooth (registered trademark) from Bluetooth Low Energy (BLE) from the restored data. However, some of the radio standards use different modulation parameter ranges. For example, Bluetooth using Gaussian frequency-shift keying (GFSK) uses a modulation index in the range between 0.28 and 0.35, and BLE uses a modulation index in the range between 0.45 and 0.55. An individual modulation index is defined as a product of a symbol period and a frequency shift amount.

In the case of radio standards that use different modulation index ranges for radio communication, these radio standards are distinguished from each other by detecting the modulation indexes from the respective radio waves received. Next, countermeasures against the interference may be taken on the basis of the determined radio standards. Thus, accurate estimation of an individual modulation index contributes to effective countermeasures against the interference. The accuracy of the estimation of a modulation index depends on the accuracy of the detection of an individual phase shift amount (corresponding to the accuracy of the detection of an individual frequency shift amount). However, in the case of a modulation method such as GFSK in which band limitation is performed on a baseband signal, the individual phase shift amount varies depending on the transmitted bit pattern.

For example, in the case of a setting in which the phase increases by $+\Delta$ per symbol period when the bit value is 1 and the phase decreases by $-\Delta$ per symbol period when the bit value is 0, if no band limitation is performed on a baseband signal, the individual phase shift amount is always $\Delta$ regardless of the bit pattern. In contrast, when the above band limitation is performed, the individual phase shift amount is not always $\Delta$. For example, the phase shift amounts corresponding to the lower two bits of a bit pattern 001 are different from the phase shift amounts corresponding to the lower two bits of a bit pattern 101.

There has been proposed a method of estimating a modulation index when the above band limitation is performed. In this method, a phase shift amount $\Delta$ is estimated when a particular bit pattern (000 . . . , 111 . . . ) formed by the same bit values appears. When such a particular bit pattern appears, the maximum phase shift amount appears. Thus, even when the above band limitation is performed, as long as the bit pattern is accurately restored, the modulation index is accurately estimated (for example, see Japanese Laid-open Patent Publication No. 2003-23467).

However, it is not very frequent that the above particular bit patterns are included in wireless packets. When a bit pattern is restored, an error occurs in practice during the restoration processing. Thus, there is a risk that a phase shift amount that does not correspond to any of the particular bit patterns could be used for the estimation. When the frequency of the appearance of these particular bit patterns is low, the above risk could significantly affect the estimation accuracy. Namely, even if the above proposed method is used, the accuracy of estimation of the modulation index may be insufficient.

SUMMARY

According to one aspect, there is provided a radio analysis apparatus including: a processor that calculates a modulation index of a radio signal generated by performing frequency shift keying on a baseband signal, based on phase shift amounts of the radio signal; and a memory that holds information in which bit patterns of the baseband signal are associated with correction values for correcting the phase shift amounts that have dropped by band limitation on the baseband signal, wherein the processor restores the bit patterns of the baseband signal based on the phase shift amounts of the radio signal, corrects the phase shift amounts of the radio signal by using the correction values corresponding to the restored bit patterns, and calculates the modulation index based on the corrected phase shift amounts.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
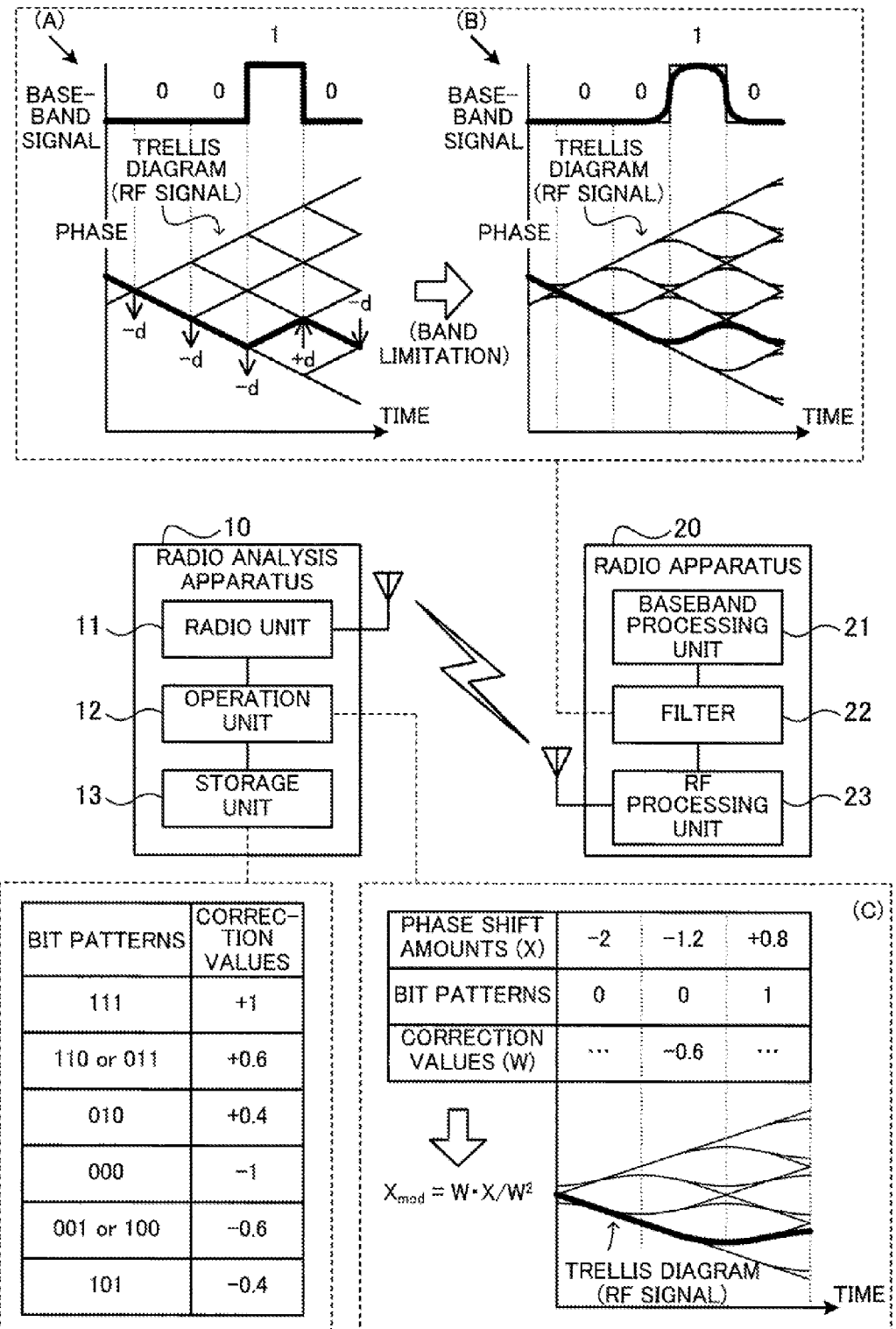
FIG. 1 illustrates an example of a radio analysis apparatus according to a first embodiment.

Hereinafter, embodiments will be described with reference to the accompanying drawings. In the description and drawings, when elements have substantially the same function, these elements will be denoted by the same reference character, and redundant description thereof will be omitted as needed.

1. First Embodiment

A first embodiment will be described with reference to FIG. 1. The first embodiment relates to a method of estimating a modulation index from a radio signal (a radio frequency (RF) signal) generated by performing FSK on a band-limited baseband signal. In particular, the first embodiment relates to a method of correcting phase shift amounts of an RF signal and calculating an estimate of a modulation index on the basis of the corrected phase shift amounts.

FIG. 1 illustrates an example of a radio analysis apparatus according to the first embodiment. In other words, a radio analysis apparatus 10 illustrated in FIG. 1 is an example of a radio analysis apparatus according to the first embodiment.

The radio analysis apparatus 10 receives an RF signal and calculates a modulation index from phase shift amounts of the received RF signal. For example, as illustrated in FIG. 1, the radio analysis apparatus 10 receives an RF signal transmitted by a radio apparatus 20 and calculates the modulation index used by the radio apparatus 20 from the received RF signal.

The radio apparatus 20 includes a baseband processing unit 21, a filter 22, and an RF processing unit 23. The baseband processing unit 21 generates a baseband signal on the basis of the bit sequence of data to be transmitted. The baseband signal is inputted to the filter 22. As the filter 22, for example, a Gaussian filter or a cosine filter such as a raised cosine filter or a square-root raised cosine filter is used. The filter 22 limits the band of the baseband signal.

As illustrated in (A) of FIG. 1, the baseband signal outputted by the baseband processing unit 21 is expressed as a square wave having an amplitude based on an individual bit value (0 or 1), for example. In contrast, the baseband signal whose band has been limited by the filter 22 is expressed as a different waveform. More specifically, as illustrated in (B) of FIG. 1, the amplitude of the baseband signal has a smooth curve at an rising edge or a falling edge (where the bit value changes from 0 to 1 or from 1 to 0). Since the filter 22 smoothes the edges of the baseband signal by performing the band limitation, the phase discontinuity that occurs at an individual frequency shift portion in the RF signal is reduced, and a spurious emission (an unnecessary component emitted to the outside of the target band) is reduced.

In addition, the band limitation on the baseband signal affects the phase shift amounts of the RF signal.

For example, when no band limitation is performed on a baseband signal, the phase of the RF signal shifts as illustrated in a trellis diagram indicated in (A) of FIG. 1. Namely, the phase of the RF signal drops by a predetermined amount d (2 in this example) in an individual period corresponding to a bit value 0 and rises by d in an individual period corresponding to a bit value 1. In this example, the bit sequence is 0010, and the phase of the RF signal is represented by a thick line in the trellis diagram. Namely, the phase first drops by −2 (a phase shift amount) and next drops by −2 (a phase shift amount). Next, the phase rises by +2 (a phase shift amount) and drops by −2 (a phase shift amount).

In contrast, when band limitation is performed on a baseband signal, the phase of the RF signal shifts as illustrated in a trellis diagram indicated in (B) of FIG. 1. As is clear from the trellis diagram in (B) of FIG. 1, the magnitude of a phase shift amount differs depending on the previous and following bit values. For example, when the edge portion where the bit value changes from 0 to 1 is examined, it is clear that the magnitude of the phase shift amount in the period corresponding to the bit value 0 is smaller than d. In addition, the magnitude of the phase shift amount in the period corresponding to the bit value 1 is smaller than that in the period corresponding to the bit value 1 in the trellis diagram in (A) of FIG. 1, since the bit value 1 follows the next bit value 0.

As described above, when band limitation is performed on a baseband signal, the magnitude of an individual phase shift amount depends on the corresponding bit pattern (a combination of the target bit value, the previous bit value, and the following bit value). Even when the magnitude of a phase shift amount drops, since the direction in which the phase shifts, i.e., rises or drops (corresponding to the plus or minus sign of the phase shift amount) is not significantly affected, the original bit sequence is restored on the basis of the plus or minus sign of the phase shift amount.

However, the estimation of a modulation index is significantly affected. A modulation index is defined as a product of a symbol period of an RF signal (the reciprocal of the symbol rate) and an individual frequency shift amount (the magnitude of an individual phase shift amount per symbol period). If the symbol rate is known, by detecting the magnitude of the individual phase shift amount, the modulation index used to modulate the RF signal is calculated. However, when the magnitude of an individual phase shift amount depends on its corresponding bit pattern as described above, it is not easy to estimate the modulation index accurately from the RF signal.

Even when band limitation is performed on a baseband signal, at a portion of a particular bit pattern 000 or 111, the individual phase shift amount is not significantly affected (see the trellis diagram in (B) of FIG. 1). Thus, by identifying these particular bit patterns from a restored bit sequence and using the phase shift amounts in the periods corresponding to the particular bit patterns, the modulation index is estimated. However, the probability that the bit sequence used to estimate the modulation index includes these particular bit patterns is low. Thus, for example, a large impact could be caused by a bit value restoration error. Namely, the estimation may lack sufficient accuracy.

Therefore, the radio analysis apparatus 10 corrects individual phase shift amounts on the basis of the respective bit patterns and calculates the modulation index on the basis of the corrected phase shift amounts. With this method, all the bit sequences for estimating the modulation index are used, and the above risk is reduced.

As illustrated in FIG. 1, the radio analysis apparatus 10 includes a radio unit 11, an operation unit 12, and a storage unit 13. For convenience of description, an example in which the radio analysis apparatus 10 receives an RF signal transmitted from the radio apparatus 20 via an antenna will be described.

The radio unit 11 receives an RF signal via an antenna. In addition, the radio unit 11 detects phase shift amounts from the received RF signal. Hereinafter, for convenience of description, a group of phase shift amounts sequentially detected from the RF signal will be expressed as a phase shift amount X by using a vector X, as needed. Information about the phase shift amount X is inputted to the operation unit 12.

The operation unit 12 is a processor such as a central processing unit (CPU), a digital signal processor (DSP), an application specific integrated circuit (ASIC), or a field programmable gate array (FPGA). For example, the operation unit 12 executes programs stored in the storage unit 13 or another memory. The storage unit 13 is a volatile storage device such as a random access memory (RAM) or a non-volatile storage device such as a hard disk drive (HDD) or a flash memory.

The storage unit 13 holds information in which bit patterns of a baseband signal are associated with correction values used to correct the phase shift amounts that have dropped by the band limitation on the baseband signal. In the example in FIG. 1, a table in which 3-bit bit patterns are associated with correction values is illustrated. For example, a bit pattern 111 is associated with a correction value +1, and a bit pattern 000 is associated with a correction value −1.

These correction values are determined on the basis of characteristics of a filter used for the band limitation on the baseband signal. For example, in the case of GFSK, a Gaussian filter is used to limit the band of the baseband signal. One of the characteristics of the Gaussian filter is expressed by a filter bandwidth parameter α that depends on the normalized half-value width (filter bandwidth) of a passband spectrum having a shape of the Gaussian function. The larger the parameter a is, the smoother an individual edge of the band-limited baseband signal will be. In this example, the correction values are determined on the basis of the parameter a. When another filter is used, the correction values may also be determined on the basis of the filter bandwidth parameter a.

The operation unit 12 restores the bit pattern of the baseband signal on the basis of the phase shift amount X of the RF signal. For example, when the sign of a phase shift amount is positive, the operation unit 12 determines that the corresponding bit value is 1. In addition, when the sign of a phase shift amount is negative, the operation unit 12 determines that the corresponding bit value is 0. For example, as illustrated in (C) of FIG. 1, when phase shift amounts are −2, −1.2, and +0.8, the operation unit 12 determines that the bit values are 0, 0, and 1, respectively.

In addition, the operation unit 12 extracts a bit pattern with a predetermined number of bits (three bits in the example in FIG. 1) from the bit sequence obtained by the above determination by sequentially shifting the target bit pattern bit by bit from the top. Next, the operation unit 12 refers to information in the storage unit 13 and determines a correction value corresponding to each of the extracted bit patterns. Hereinafter, for convenience of description, a group of correction values associated with the respective bit patterns will be expressed as a correction value W by using a vector W, as needed.

For example, as illustrated in (C) of FIG. 1, when the operation unit 12 has extracted a bit pattern 001, the operation unit 12 determines a correction value −0.6 associated with the bit pattern 001. This correction value −0.6 is used to correct the phase shift amount −1.2 corresponding to the bit value 0 in the middle of the bit pattern 001. By sequentially determining the correction values in this way, the correction value W is obtained. After the correction value W is obtained, the operation unit 12 calculates a corrected phase shift amount (a phase shift amount reference value $X_{mod}$, which is a scalar quantity), by using the phase shift amount X and the correction value W.

For example, the phase shift amount reference value $X_{mod}$ is expressed by the following expression (1). The operation unit 12 calculates the modulation index on the basis of the phase shift amount reference value $X_{mod}$, which is an estimate of the phase shift amount when no band limitation is performed. By using this method, the bit patterns other than the above particular bit patterns may also be used to estimate the modulation index. Thus, more phase shift amounts are used to estimate the modulation index, and the impact of a bit value restoration error on the estimation accuracy is reduced. As a result, higher estimation accuracy is obtained than the method using only the particular bit patterns.

$$X_{mod} = W \cdot X / W^2 \quad (1)$$

After the modulation index is estimated, a radio standard could be determined from the modulation index. For example, the modulation index in the range between 0.28 and 0.35 is used in Bluetooth, and the modulation index in the range between 0.45 and 0.55 is used in BLE. It is not easy to distinguish Bluetooth from BLE from the frequency band, header information, etc. Thus, if the modulation index is accurately estimated, it is possible to distinguish between Bluetooth and BLE by using the modulation index. Among the radio standards using FSK, for example, ANT and ANT+ are hard to distinguish from each other. ANT and ANT+ are near-field communication protocols of an ultra-low power consumption type.

In an environment in which a plurality of radio apparatuses use the above radio standards, there are cases where the cause of a radio wave interference needs to be analyzed or the interference needs to be controlled to reduce. In such cases, if the radio standards have been determined, the analysis or control is performed more easily. By applying the technique according to the first embodiment, the radio standards, which are conventionally difficult to distinguish from each other, are accurately distinguished from each other by the frequency band, header information, etc. Namely, the radio environment is analyzed and managed more easily. Thus, the first embodiment contributes to improvement of the radio environment.

The first embodiment has thus been described.

2. Second Embodiment

Next, a second embodiment will be described. The second embodiment relates to a method of estimating a modulation index from an RF signal generated on the basis of a band-limited baseband signal. In particular, the second embodiment relates to a method of correcting phase shift amounts of an RF signal and estimating a modulation index on the basis of the corrected phase shift amounts.

[2-1. System]

Figure 2:
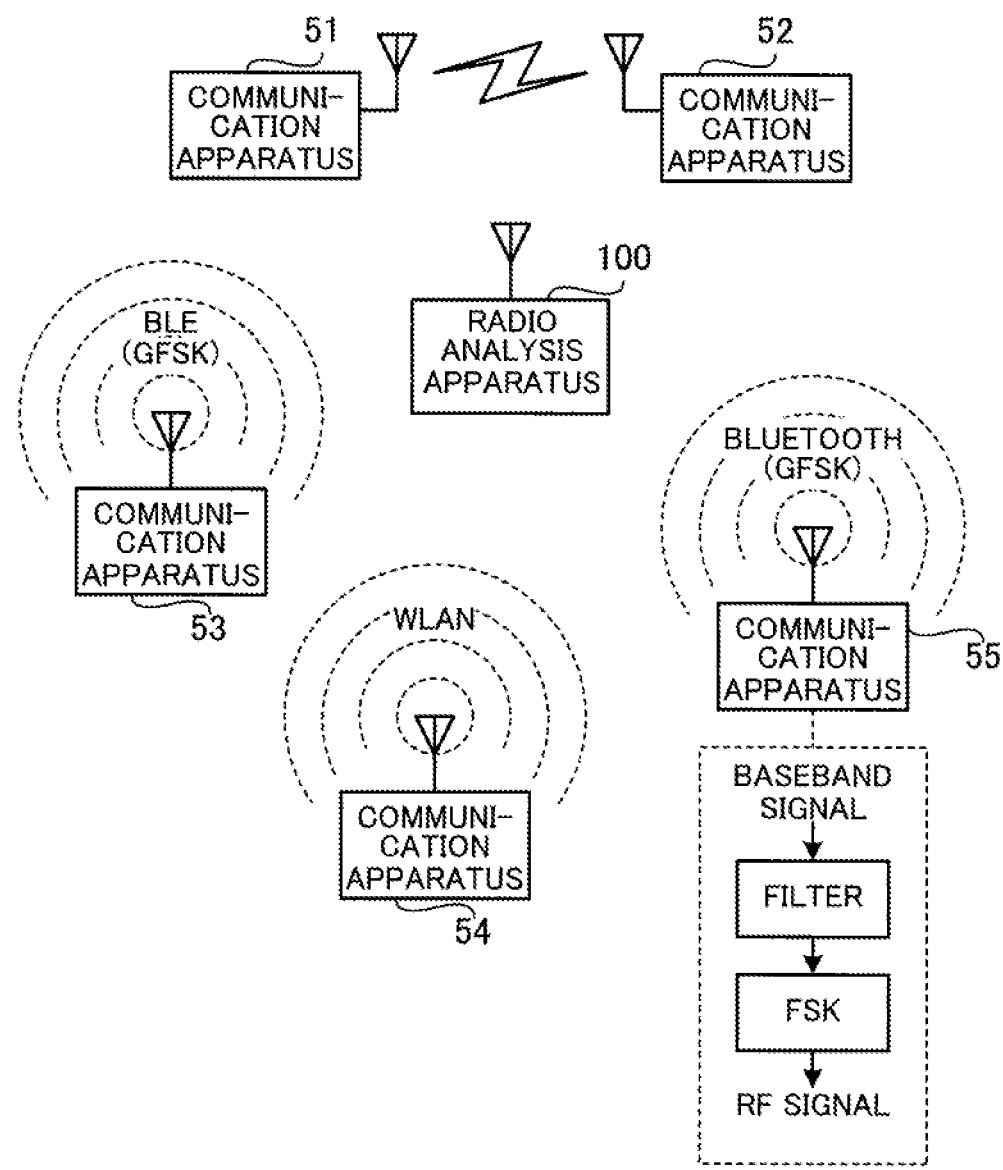
FIG. 2 illustrates an example of a system according to a second embodiment.

Hereinafter, for convenience of description, a system illustrated as an example in FIG. 2 will be described. FIG. 2 illustrates an example of a system according to the second embodiment.

The system illustrated as an example in FIG. 2 includes communication apparatuses 51 to 55 and a radio analysis apparatus 100. Each of the communication apparatuses 51 to 55 is an electronic apparatus capable of performing radio communication by using an antenna. Examples of the electronic apparatus include a wireless terminal such as a mobile phone or a smartphone, a computer such as a personal computer (PC) or a server, a radio communication apparatus such as a base station or a relay station, and a peripheral device such as a wireless keyboard or mouse.

For example, each of the communication apparatuses 51, 52, and 55 performs radio communication by using Bluetooth. The communication apparatus 53 performs radio communication by using BLE. The communication apparatus 54 performs radio communication by using a wireless local area network (WLAN). In Bluetooth and BLE, GFSK is used as the modulation method. For example, the communication apparatus 55 limits the band of a baseband signal by using a Gaussian filter, modulates the band-limited baseband signal by using FSK, and generates an RF signal.

Figure 3:
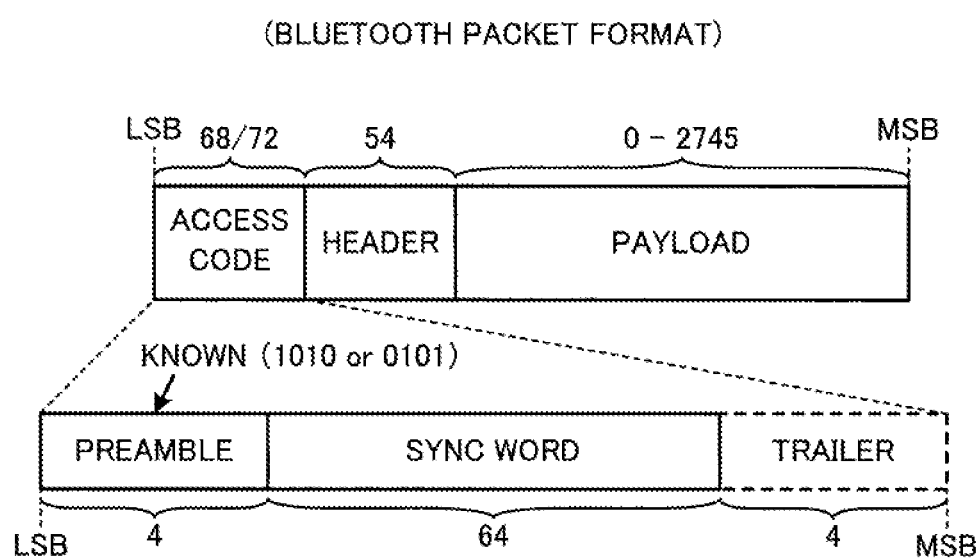
FIG. 3 illustrates an example of a Bluetooth packet format.

A Bluetooth packet has a format as illustrated in FIG. 3. FIG. 3 illustrates an example of a Bluetooth packet format. As illustrated in FIG. 3, the Bluetooth packet format includes areas named ACCESS CODE, HEADER, and PAYLOAD. The ACCESS CODE area includes areas named PREAMBLE, SYNC WORD, and TRAILER. The area PREAMBLE, which is a known signal (1010 or 0101), is formed by four bits.

Figure 4:
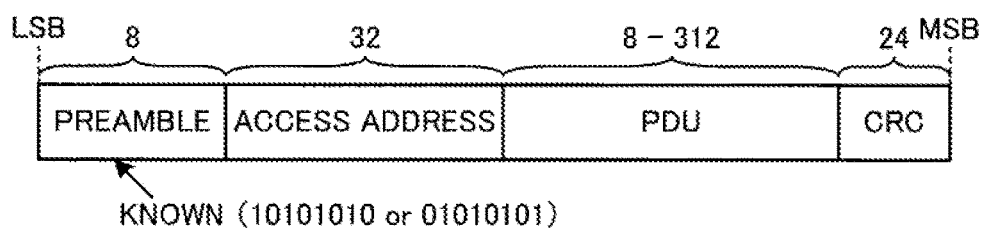
FIG. 4 illustrates an example of a Bluetooth Low Energy (BLE) packet format.

In contrast, a BLE packet has a format as illustrated in FIG. 4. FIG. 4 illustrates an example of a BLE packet format. As illustrated in FIG. 4, the BLE packet format includes areas named PREAMBLE, ACCESS ADDRESS, PDU, and CRC. The PREAMBLE area, which is a known signal (10101010 or 01010101), is formed by eight bits.

As described above, the known signals (PREAMBLE) included in Bluetooth and BLE packets are short, and the bit patterns in the two known signals include many common portions. Thus, it is not easy to distinguish Bluetooth and BLE from each other by this known signal. However, the range (between 0.28 and 0.35) of the modulation index defined in Bluetooth differs from the range (between 0.45 and 0.55) of the modulation index defined in BLE. Thus, if the difference between the modulation indexes is used, Bluetooth and BLE are distinguished from each other.

The radio analysis apparatus 100 receives RF signals transmitted from the communication apparatuses 51 to 55 and determines the radio standards on the basis of the modulation indexes of the received RF signals, respectively. Next, the radio analysis apparatus 100 notifies a user (a system administrator, etc.) of the determined radio standards. For example, when the communication quality between the communication apparatuses 51 and 52 is deteriorated, the radio analysis apparatus 100 determines the radio standard corresponding to the interference wave causing the deterioration of the communication quality. In this case, the user is able to instruct the communication apparatus communicating on the basis of the radio standard to reduce the output. As a result, the interference wave is reduced.

A modulation index is expressed as a product of a symbol period of an RF signal (the reciprocal of the symbol rate) and an individual frequency shift amount (the magnitude of an individual phase shift amount per symbol period). If the symbol rate is known, by detecting the magnitude of the individual phase shift amount, the modulation index used to modulate the RF signal is calculated.

Figure 5:
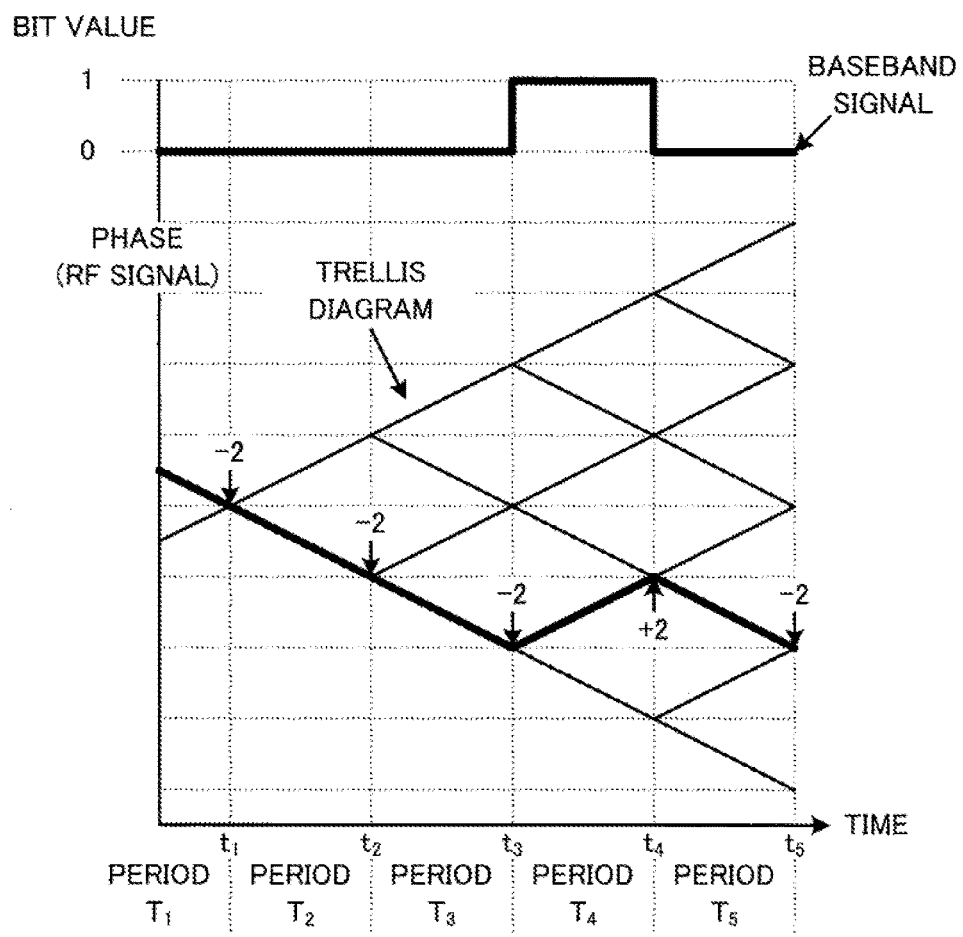
FIG. 5 illustrates a relationship between a bit pattern of a baseband signal and phase shift of a radio frequency (RF) signal (trellis diagram) when frequency-shift keying (FSK) is used.

In the case of FSK, a relationship between a bit pattern of a baseband signal and the phase of an RF signal is expressed by a trellis diagram as illustrated in FIG. 5. FIG. 5 illustrates a relationship between a bit pattern of a baseband signal and phase shift of an RF signal (trellis diagram) when FSK is used. In the case of FSK, when the bit value is 1, the phase of the RF signal rises by a predetermined amount in a period corresponding to the bit value. In contrast, when the bit value is 0, the phase of the RF signal drops by the predetermined amount in a period corresponding to the bit value.

FIG. 5 illustrates a baseband signal indicating a bit sequence 00010 and phase shift (a thick line) of the RF signal corresponding to the baseband signal. Since a period $T_1$ corresponds to the first bit value 0, the phase shifts only by −2 in the period $T_1$. The phase also shifts only by −2 in periods $T_2$ and $T_3$. Since a period $T_4$ corresponds to a bit value 1, the phase shifts only by +2 in the period $T_4$. Next, in a period $T_5$ corresponding to a bit value 0, the phase shifts only by −2.

Figure 6:
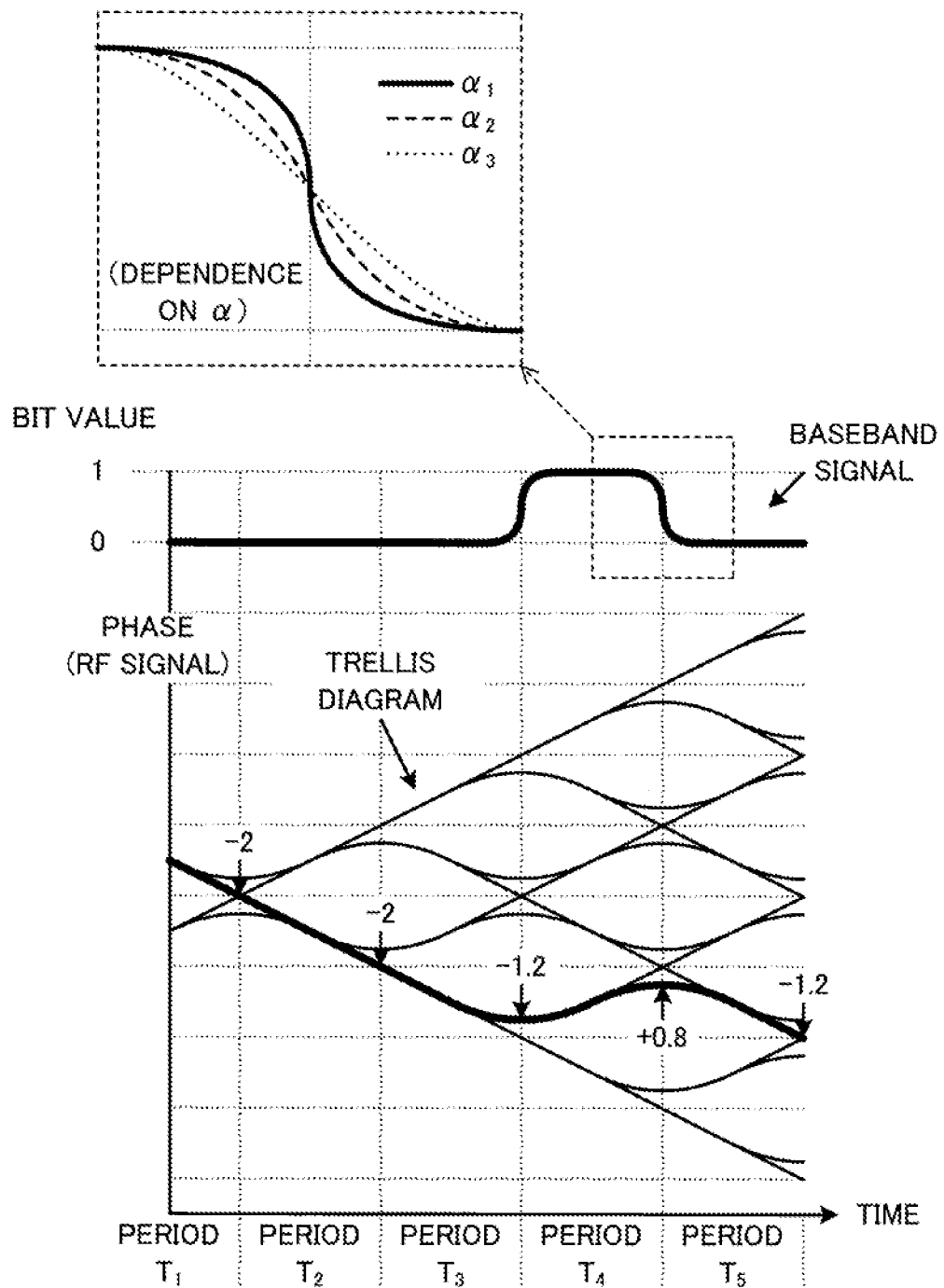
FIG. 6 illustrates a relationship between a bit pattern of a baseband signal and phase shift of an RF signal (trellis diagram) when Gaussian frequency-shift keying (GFSK) is used.

In the example in FIG. 5, in any of the periods, the magnitude of the phase shift amount is 2. Thus, the modulation index is calculated by detecting the phase shift amount. However, in the case of GFSK used by Bluetooth and BLE, the band of the baseband signal is limited by a Gaussian filter. In this case, the waveform of the baseband signal and the phase shift of the RF signal are expressed as illustrated in FIG. 6. FIG. 6 illustrates a relationship between a bit pattern of a baseband signal and phase shift of an RF signal (trellis diagram) when GFSK is used.

When the band of a baseband signal is limited by a Gaussian filter, the waveform has a smooth curve at an individual edge portion where the bit value changes. The smoothness of the curve depends on the filter bandwidth parameter α of the Gaussian filter. The larger the parameter α is, the smoother the curve will be ($α_1<α_2<α_3$). If the baseband signal has smoother edges, the phase discontinuity that occurs at an individual frequency shift portion in the RF signal is reduced, and a spurious emission is reduced.

However, as illustrated in FIG. 6, the band limitation on the baseband signal affects the phase shift amounts of the RF signal. In the example in FIG. 6, the phase shift amounts in periods $T_1$ and $T_2$ are −2, and the phase shift amount in a period $T_3$ is −1.2. In addition, the phase shift amount in a period $T_4$ is +0.8, and the phase shift amount in a period $T_5$ is −1.2. The magnitudes of the phase shift amounts in the periods $T_3$ to $T_5$ illustrated in FIG. 6 are smaller than those of the phase shift amounts in the corresponding periods illustrated in FIG. 5.

In addition, the magnitude of an individual phase shift amount varies depending on the previous and following bit values. For example, in the case of the period $T_3$ corresponding to the bit value 0, the bit value in the previous period $T_2$ is 0 and the bit value in the following period $T_4$ is 1. Namely, the period $T_3$ is the period forming a bit pattern 001 with its bit value and the previous and following bit values. In addition, the phase shift amount in the period $T_3$ corresponding to the bit pattern 001 is −1.2.

In contrast, the phase shift amount in the period $T_4$ corresponding to a bit pattern 010 is +0.8, and the phase shift amount in the period $T_5$ corresponding to a bit pattern 100 is −1.2. In addition, the phase shift amount in the period $T_2$ corresponding to the bit pattern 000 is −2. In this way, if the band of the baseband signal is limited, the magnitude of an individual phase shift amount varies depending on the corresponding bit pattern. Thus, if the modulation index is calculated by directly using the phase shift amounts detected in periods, the modulation index is not accurately estimated. Therefore, the radio analysis apparatus 100 corrects the phase shift amounts that have been changed by the band limitation of the baseband signal and calculates a modulation index on the basis of the corrected phase shift amounts.

Next, the radio analysis apparatus 100 will be described in more detail.

[2-2. Hardware]

Figure 7:
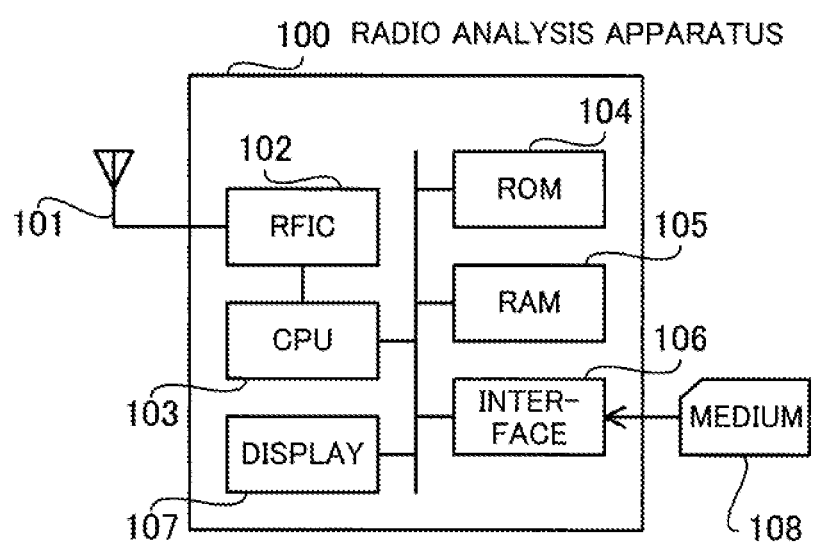
FIG. 7 is a block diagram illustrating an example of hardware that realizes functions of a radio analysis apparatus according to the second embodiment.

For example, functions of the radio analysis apparatus 100 may be realized by using hardware as illustrated in FIG. 7. FIG. 7 is a block diagram illustrating an example of hardware that realizes functions of a radio analysis apparatus according to the second embodiment.

As illustrated in FIG. 7, the radio analysis apparatus 100 includes an antenna 101, a radio frequency integrated circuit (RFIC) 102, a CPU 103, a ROM (read-only memory) 104, a RAM 105, an interface 106, and a display 107.

The antenna 101 is an antenna used to exchange RF signals. The radio analysis apparatus 100 may include a plurality of antennas 101. The RFIC 102 is a circuit that converts baseband signals and RF signals. The CPU 103 is a processor that performs various kinds of calculation. The CPU 103 may be a processor including a plurality of operation units. Namely, the CPU 103 may be a multiprocessor or a multi-core processor.

The ROM 104 is a memory that holds programs used for operations performed by the CPU 103. The RAM 105 is a memory that temporarily holds various kinds of data such as data that the CPU 103 uses while performing an operation and data temporarily generated during an operation.

The interface 106 is an interface for connecting a detachable recording medium 108 to the radio analysis apparatus 100. Examples of the recording medium 108 include a semiconductor memory, a magnetic disk, and an optical disc. The display 107 is a display device such as a cathode ray tube (CRT), a liquid crystal display (LCD), a plasma display panel (PDP), or an electro-luminescence display (ELD).

[2-3. Functions]

Figure 8:
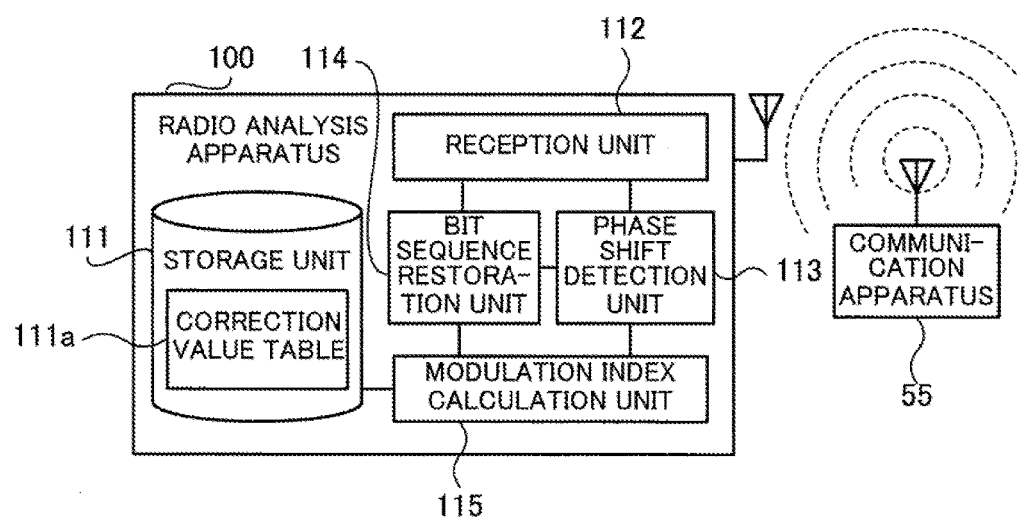
FIG. 8 is a block diagram illustrating an example of functions of the radio analysis apparatus according to the second embodiment.

The radio analysis apparatus 100 includes functions illustrated in a block diagram in FIG. 8. FIG. 8 is a block diagram illustrating an example of functions of the radio analysis apparatus according to the second embodiment.

As illustrated in FIG. 8, the radio analysis apparatus 100 includes a storage unit 111, a reception unit 112, a phase shift detection unit 113, a bit sequence restoration unit 114, and a modulation index calculation unit 115.

Functions of the storage unit 111 may be realized by using the above RAM 105, for example. Functions of the reception unit 112 and the phase shift detection unit 113 may be realized by using the above RFIC 102, for example. Functions of the bit sequence restoration unit 114 and the modulation index calculation unit 115 may be realized by using the above CPU 103, for example.

Figure 9:
FIG. 9 illustrates an example of a correction value table according to the second embodiment.

The storage unit 111 holds a correction value table 111a. As illustrated in FIG. 9, the correction value table 111a is a table in which bit patterns are associated with correction values used to correct the phase shift amounts. FIG. 9 illustrates an example of a correction value table according to the second embodiment. In this example, 3-bit bit patterns are associated with respective correction values. Each of the 3-bit bit patterns is formed by the target bit value corresponding to the phase shift amount to be corrected and the previous and following bit values of the target bit value.

The correction value table 111a holds eight 3-bit bit patterns of 111, 110, 011, 010, 000, 001, 100, and 101. In the correction value table 111a, a correction value is associated with each of these eight bit patterns.

Whether the bit pattern is 110 or 011, the phase shift amount is the same, as is clear from the trellis diagram (see FIG. 6). Likewise, whether the bit pattern is 001 or 100, the phase shift amount is the same. Thus, in the correction value table 111a, the same correction value is associated with the bit patterns 110 and 011. In addition, the same correction value is associated with the bit patterns 001 and 100.

The reception unit 112 receives an RF signal and inputs the received RF signal to the phase shift detection unit 113. For convenience of description, the following example will assume that the reception unit 112 receives an RF signal from the communication apparatus 55 that transmits data based on Bluetooth using GFSK. The phase shift detection unit 113 detects the phase shift amount of the RF signal in an individual symbol period. Hereinafter, the phase shift amount detected in a period $T_n$ (n=0, 1, 2, . . . ) will be expressed as $X_n$, and a group of phase shift amounts $\{X_1, X_2, \ldots\}$ will be expressed as a phase shift amount X ($X=(X_1, X_2, \ldots)$) by using a vector X, as needed.

The phase shift amount X is inputted to the bit sequence restoration unit 114. The bit sequence restoration unit 114 restores the bit sequence of the baseband signal on the basis of the phase shift amount X. For example, when the sign of a phase shift amount $X_n$ (n=0, 1, 2, . . . ) is positive, the bit sequence restoration unit 114 determines that the corresponding bit value is 1. In addition, when the sign of a phase shift amount $X_n$ is negative, the bit sequence restoration unit 114 determines that the corresponding bit value is 0. The bit sequence restoration unit 114 outputs a determined group of bit values as a restored bit sequence. The bit sequence outputted by the bit sequence restoration unit 114 is inputted to the modulation index calculation unit 115.

The modulation index calculation unit 115 calculates the phase shift amount reference value $X_{mod}$ ($X_{mod}$ is a scalar quantity) that is used to calculate the modulation index, by using the phase shift amount X detected by the phase shift detection unit 113 and the bit sequence restored by the bit sequence restoration unit 114. Next, the modulation index calculation unit 115 calculates the modulation index by using the phase shift amount reference value $X_{mod}$.

Figure 10:
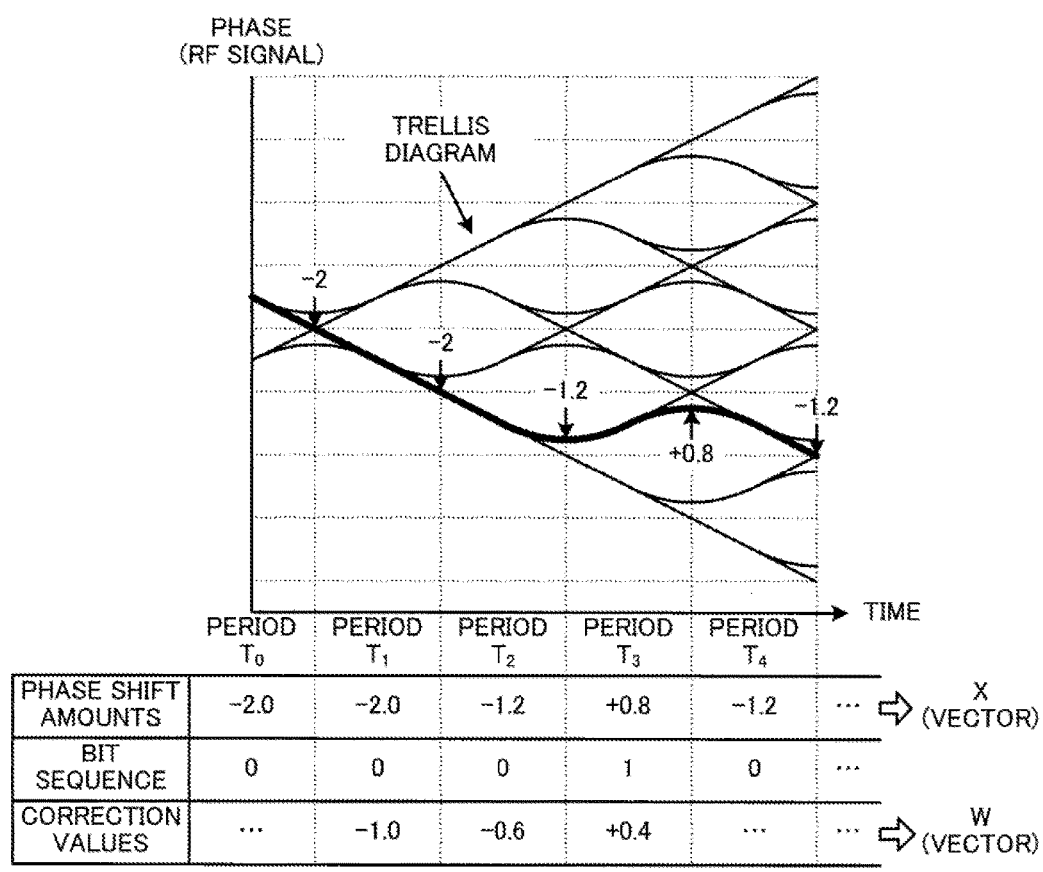
FIG. 10 illustrates a method of selecting correction values according to the second embodiment.

Hereinafter, calculation processing of the modulation index calculation unit 115 will be described in more detail with reference to the example in FIG. 10. FIG. illustrates a method of selecting correction values according to the second embodiment. In the example in FIG. 10, a group of phase shift amounts {−2.0, −2.0, −1.2, +0.8, −1.2, . . . } have been obtained. 00010 . . . is the bit sequence corresponding to this group of phase shift amounts.

The modulation index calculation unit 115 extracts a 3-bit bit pattern that begins with the first bit of the above bit sequence (the first bit is the reference bit in this case). In this example, a bit pattern 000 is extracted. The modulation index calculation unit 115 refers to the correction value table 111*a* (see FIG. 9) and selects a correction value −1.0 corresponding to the bit pattern 000. Next, the modulation index calculation unit 115 sets the selected correction value as the correction value for the phase shift amount $X_1$ corresponding to the center bit of the bit pattern 000.

Next, the modulation index calculation unit 115 extracts a 3-bit bit pattern that begins with the second bit of the bit sequence (the second bit is the reference bit in this case). In this example, a bit pattern 001 is extracted. The modulation index calculation unit 115 refers to the correction value table 111*a* (see FIG. 9) and selects a correction value −0.6 corresponding to the bit pattern 001. Next, the modulation index calculation unit 115 sets the selected correction value as the correction value for the phase shift amount $X_2$ corresponding to the center bit of the bit pattern 001.

Likewise, the modulation index calculation unit 115 extracts other bit patterns while moving the reference bit one bit by one bit and selects correction values corresponding to the extracted bit patterns from the correction value table 111*a*. Next, the modulation index calculation unit 115 sets the selected correction values as the correction values for the phase shift amounts corresponding to the center bits of the bit patterns, respectively. Hereinafter, the correction values corresponding to the respective phase shift amounts $X_n$ (n=1, 2, . . . ) will be expressed as $W_n$, and a group of correction values {$W_1$, $W_2$, . . . } will be expressed as a correction value W by using a vector W (W=$W_2$, . . . )), as needed.

The modulation index calculation unit 115 calculates the phase shift amount reference value $X_{mod}$ by using the phase shift amount X and the correction value W. For example, the modulation index calculation unit 115 calculates the phase shift amount reference value $X_{mod}$ on the basis of the following expression (2). Namely, the modulation index calculation unit 115 calculates a sum of products of a phase shift amount $X_n$ (n=1, 2 . . . ) and a correction value $W_n$ and divides the sum of products by a sum of squares of the correction value $W_n$ (corresponding to processing of an optimum filter). The sum of products obtained after the division will be set as the phase shift amount reference value $X_{mod}$.

$$X_{mod} = W \cdot X / W^2 \quad (2)$$

$$= \sum_{n=1}^{N-1} X_n W_n \Big/ \sum_{n=1}^{N-1} W_n^2$$

The modulation index calculation unit 115 calculates a product of the phase shift amount reference value $X_{mod}$ (a positive value) and a known symbol period (the reciprocal of the symbol rate) and outputs the product as the modulation index. When the sampling timing of the phase shift amount $X_n$ is equal to the symbol rate and when the phase shift amount reference value is the phase shift amount maximum value, the modulation index is expressed by $X_{mod}/\pi$. In this case, the modulation index calculation unit 115 outputs $X_{mod}/\pi$ as the modulation index. The modulation index is outputted to the display 107 or the like, for example.

Hereinafter, the calculation of the reference value $X_{mod}$ will be described in more detail.

The phase shift amount X is expressed as illustrated by the following expression (3) by using the correction value W and the reference value $X_{mod}$. A signal Sig received by the radio analysis apparatus 100 is expressed as illustrated by the following expression (4) by using a noise η. When the signal-to-noise (SN) ratio is most suitable and when the bit sequence is accurately restored, since the noise η is negligible, the reference value $X_{mod}$ is obtained by calculating an inner product of W and Sig (see the following expression (5)). Namely, the relational expression expressed by the above expression (2) is obtained.

$$X = X_{mod} W \quad (3)$$

$$Sig = X_{mod} W + \eta \quad (4)$$

$$W \cdot Sig / W^2 = X_{mod} + W \cdot \eta / W^2 \quad (5)$$

(Functions of Communication Apparatuses)

Figure 11:
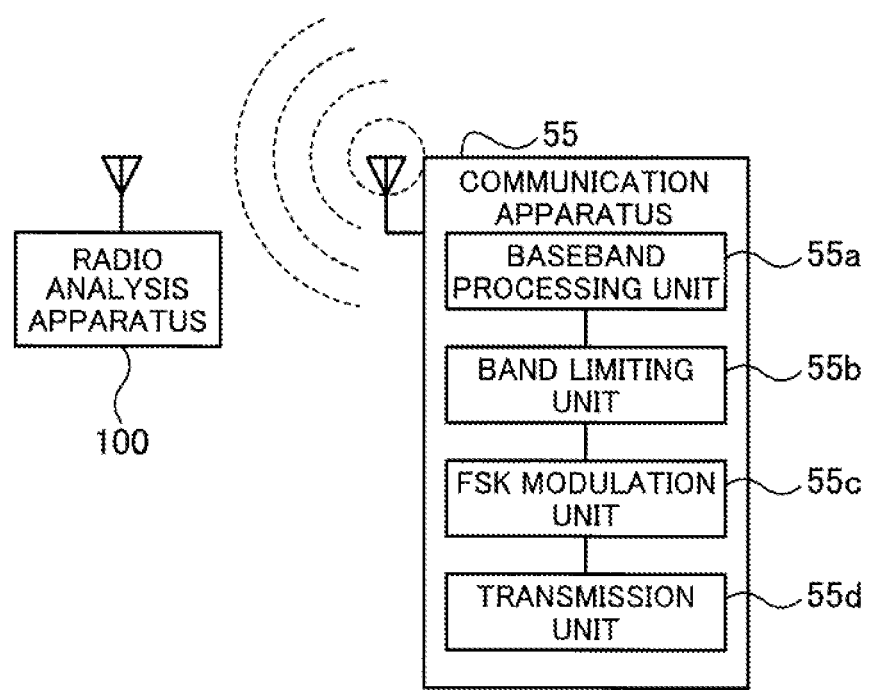
FIG. 11 is a block diagram illustrating an example of functions of a communication apparatus that performs communication on the basis of GFSK.

Next, functions of the communication apparatus 55 will be described with reference to FIG. 11. FIG. 11 is a block diagram illustrating an example of functions of a communication apparatus that performs communication based on GFSK.

As illustrated in FIG. 11, the communication apparatus 55 includes a baseband processing unit 55*a*, a band limiting unit 55*b*, an FSK modulation unit 55*c*, and a transmission unit 55*d*. The baseband processing unit 55*a* generates a baseband signal on the basis of a bit sequence transmitted. The band limiting unit 55*b* limits the band of the baseband signal by using a Gaussian filter. The FSK modulation unit 55*c* modulates the band-limited baseband signal on the basis of FSK and generates an RF signal. The transmission unit 55*d* transmits the RF signal via an antenna.

The radio analysis apparatus 100 receives the RF signal transmitted by the communication apparatus 55 and estimates the modulation index used by the communication apparatus 55 on the basis of the received RF signal. As described above, the radio analysis apparatus 100 corrects phase shift amounts of the RF signal and estimates the modulation index on the basis of the corrected phase shift amounts. Thus, even when the radio analysis apparatus 100 receives an RF signal transmitted by a communication apparatus such as the communication apparatus 55 that limits the band of a baseband signal, the radio analysis apparatus 100 is able to accurately estimate the modulation index.

(Method of Generating Correction Value Table)

Figure 12:
FIG. 12 illustrates a method of generating a correction value table according to the second embodiment.
Figure 13:
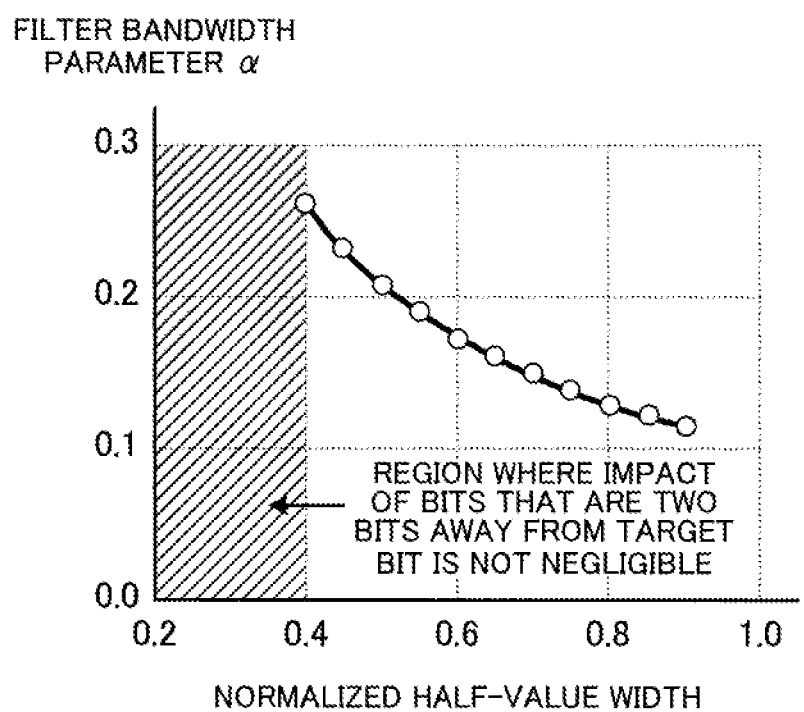
FIG. 13 illustrates an example of characteristics of a Gaussian filter.

Next, a method of generating the correction value table 111*a* will be described with reference to FIGS. 12 and 13. FIG. 12 illustrates a method of generating a correction value table according to the second embodiment. FIG. 13 illustrates an example of characteristics of a Gaussian filter.

The correction values stored in the correction value table 111*a* are determined on the basis of the filter bandwidth parameter a, as illustrated in FIG. 12. In the case of a Gaussian filter, the filter bandwidth parameter α and the normalized half-value width of a passband spectrum expressed by the Gaussian function have a relationship as illustrated in FIG. 13. As illustrated in FIG. 13, the larger the parameter α is, the smaller the normalized half-value width will be. Namely, since the baseband signal is more affected by the band limitation, an individual edge of the baseband signal is more smoothed (see FIG. 6).

Generally, when a tap coefficient of a filter (impulse response of a discrete filter) is expressed as h(t) and when a baseband signal q(t) is at the level of +1 or −1, the baseband signal y(t) having passed through the filter is expressed by the following expression (6). Herein, when the length of a single symbol is T, a phase shift amount p(i) from (i−1)T to iT of an FSK signal (corresponding to the above RF signal) modulated on the basis of FSK is expressed by the following expression (7). In expression (7), z(i) is expressed by the following expression (8), and g(a) is expressed by the following expression (9). In addition, A is a scalar quantity.

$$y(t) = \sum_s x(s)h(t-s) \quad (6)$$

$$p(i) = A \sum_{(i-1)T \leq t < iT} y(t) \quad (7)$$
$$= A \sum_{(i-1)T \leq t < iT} \sum_s x(s)h(t-s)$$
$$= A \sum_a z(i+a) \sum_{0 \leq t < T} \sum_{aT \leq s < (a+1)T} h(t-s)$$
$$= A \sum_a z(i+a)g(a)$$

$$z(i) = x(t)|_{(i-1)T \leq t < iT} \quad (8)$$

$$g(a) = \sum_{0 \leq t < T} \sum_{aT \leq s < (a+1)T} h(t-s) \quad (9)$$

From the above expression (7), a correction value r(i) is expressed by the following expression (10). The phase shift amount reference value $X_{mod}$ is expressed by the following expression (11). In addition, g(a) is defined on the basis of setting of the filter used to limit the band of the baseband signal. In addition, g(a) represents the magnitude of the impact of a bit value corresponding to a symbol away from a target symbol by distance a on the phase shift amount p(i) of the target symbol. When a Gaussian filter whose normalized half-value width (3 dB bandwidth symbol time product) is 0.5, g(a)=g(−a) and g(a)|$_{a \geq 2}$<<1. In addition, α is expressed by the following expression (12).

$$r(i) = \sum_a z(i+a)g(a) \Big/ \sum_a g(a) \quad (10)$$

$$X_{mod} = A \sum_a g(a) \quad (11)$$

$$\alpha = 2g(1)/\{g(0) + 2g(1)\} \quad (12)$$

As illustrated in FIG. 13, when the normalized half-value width of the Gaussian filter is smaller than 0.4, the impact of a bit value located two symbols away from the target symbol on the phase shift amount corresponding to the target symbol is not negligible.

Figure 14:
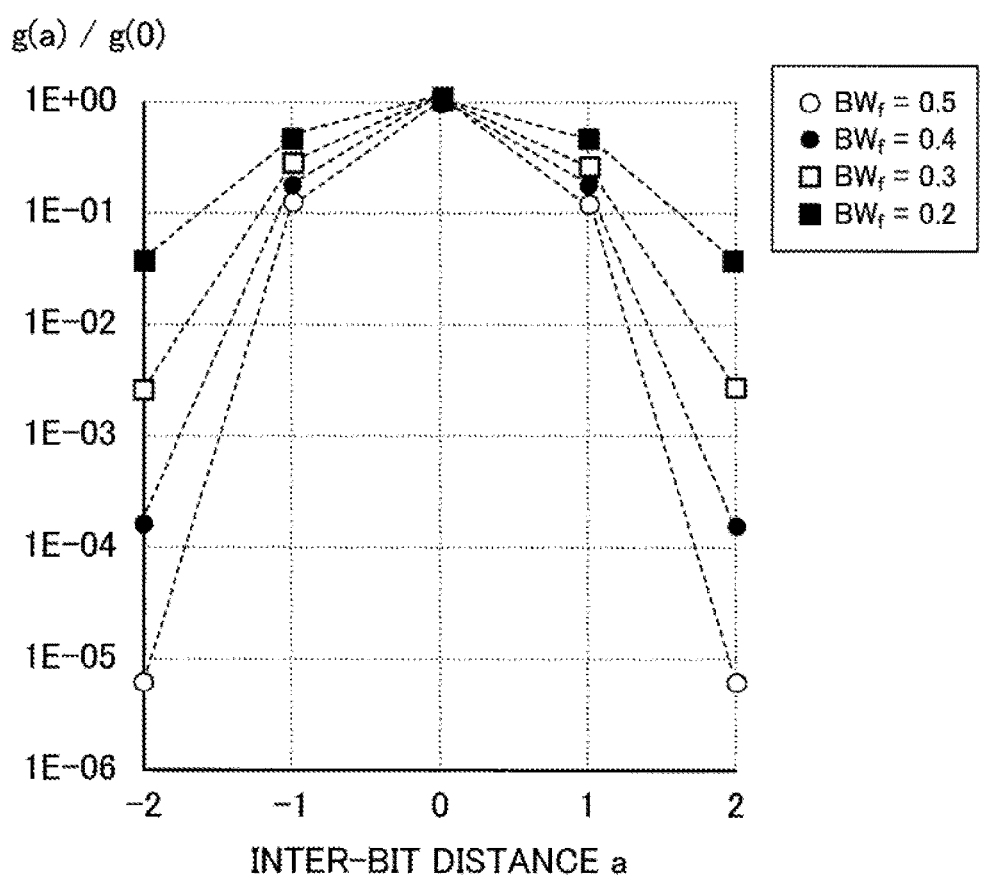
FIG. 14 illustrates a relationship between the inter-bit distance with which impact is caused by band limitation and the normalized half-value width.

The relationship between the distance a to a bit value that affects the phase shift amount corresponding to the target symbol (inter-bit distance) and the magnitude of the impact (g(a)/g(0)) is illustrated in FIG. 14. FIG. illustrates a relationship between the inter-bit distance with which impact is caused by band limitation and the normalized half-value width. In FIG. 14, when the distance a is 2, g(a)/g(0) indicates various values depending on the normalized half-value width $BW_f$. For example, g(a)/g(0) when $BW_f$ is 0.3 is larger than that when $BW_f$ is 0.5 by two digits. In addition, g(a)/g(0) when $BW_f$ is 0.2 is larger than that when $BW_f$ is 0.5 by three digits.

When $BW_f$ is small and when a bit value two bits away from the target bit affects the phase shift amount corresponding to the target symbol, the length of the bit pattern may be extended from three bits to five bits. In this case, by using the correction values corresponding to the respective bit patterns, correction in view of the above impact is performed. In addition, in this case, 5-bit bit patterns and correction values corresponding to the respective 5-bit bit patterns are stored in the correction value table 111a. In addition, by using the correction values stored in the correction value table 111a, the phase shift amount reference value $X_{mod}$ is calculated on the basis of the above expression (2).

(Simulation)

Figure 15:
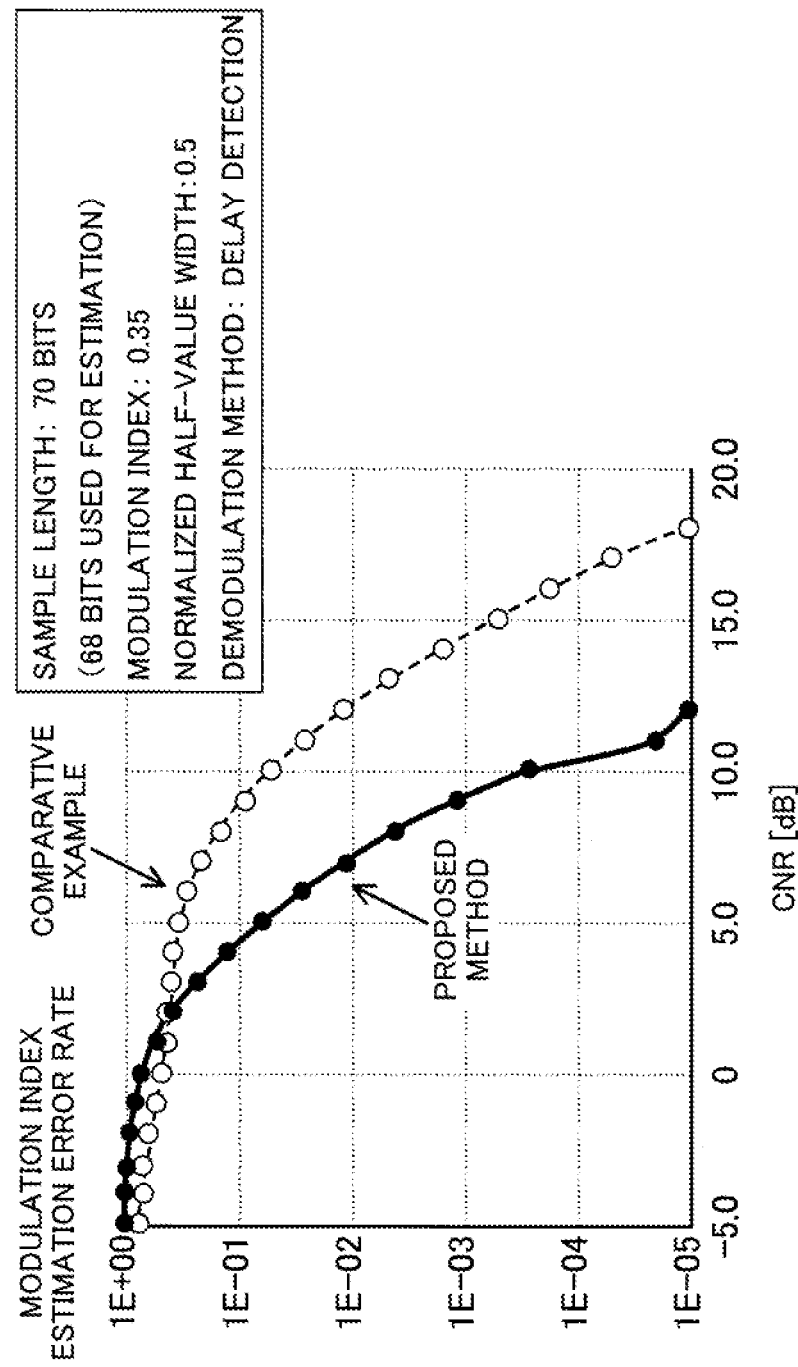
FIG. 15 illustrates a simulation result obtained by applying a modulation index estimation method according to the second embodiment and a simulation result obtained by applying a comparative example.

Next, results of simulations will be described with reference to FIG. 15. These simulations were conducted to check an advantageous effect obtained by applying the technique (proposed method) according to the second embodiment. FIG. 15 illustrates a simulation result obtained by applying a modulation index estimation method according to the second embodiment and a simulation result obtained by applying a comparative example.

FIG. 15 illustrates a simulation result (indicated by white circles and a dashed line) obtained by a comparative example in which phase shift amounts were detected at portions corresponding to particular bit pattern 000 or 111 and a modulation index was estimated on the basis of the detected phase shift amounts. In each of these simulations, the length (sample length) of the bit sequence restored from the phase shift amounts of an RF signal was 70 bits, and 68 bits thereof was used to estimate the modulation index. In addition, GFSK in which the modulation index=0.35 and $BW_f$=0.5 was used as the modulation method.

When the second embodiment and the comparative example are compared with each other under the above conditions, as illustrated in FIG. 15, the carrier-to-noise ratio (CNR) of the proposed method is better than that of the comparative example by about 4 dB to 5 dB in the region where the modulation index estimation error rate is approximately 10%. In addition, it is seen that, when a packet whose CNR is 10 dB is detected, the modulation index estimation error rate of the proposed method is better than that of the comparative example by about two digits. Namely, application of the technique according to the second embodiment provides a larger improvement effect than that provided by the comparative example.

(First Variation: Correction of Deviation)

Figure 16:
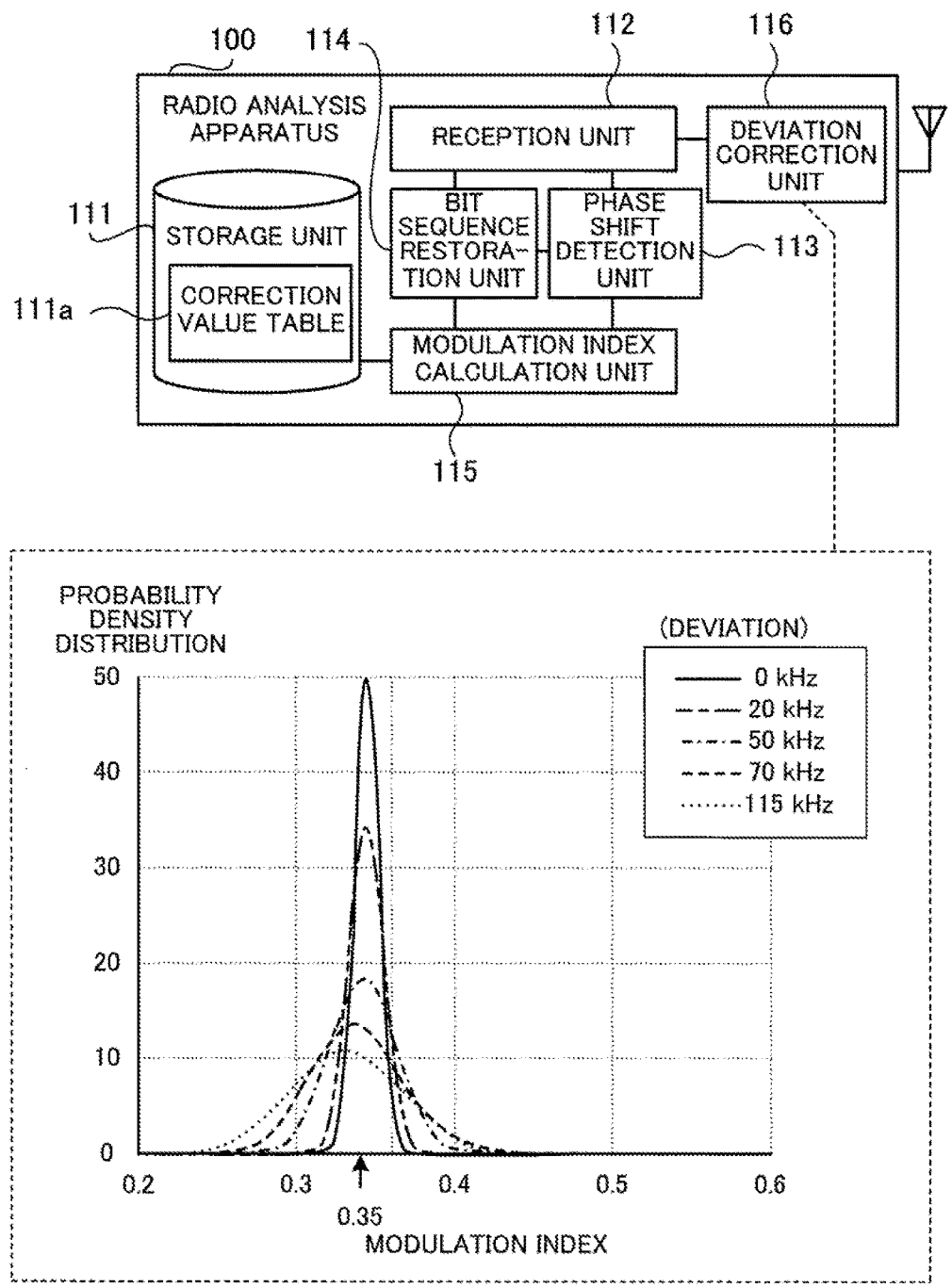
FIG. 16 illustrates functions of a radio analysis apparatus according to a first variation (correction of deviation) of the second embodiment.

Next, a first variation of the second embodiment will be described with reference to FIG. 16. FIG. 16 illustrates functions of a radio analysis apparatus according to a first variation (correction of deviation) of the second embodiment.

As described above, when estimating a modulation index, the radio analysis apparatus 100 uses a bit sequence restored by demodulating a received RF signal. Thus, the accuracy of the restoration of the bit sequence affects the accuracy of the estimation of the modulation index.

It is ideal to have the frequency of a radio wave specified as a radio wave used for radio communication and the frequency of a radio wave actually outputted by a communication apparatus matched perfectly. However, since it is technically difficult to perfectly match the two frequencies at all times, a certain degree of deviation (frequency deviation) is allowed in radio standards. Thus, deviation is caused between the frequencies actually used by a transmitter and a receiver, respectively, and this deviation could deteriorate the accuracy of the restoration of the bit sequence.

FIG. 16 illustrates, as an example, the probability density distribution of the modulation index estimated when the frequency deviation is 0 kHz, 20 kHz, kHz, 70 kHz, and 115 kHz. As the modulation method, GFSK in which the modulation index is 0.35 is used. As is clear from FIG. 16, the larger the frequency deviation is, the wider the probability density distribution will be.

For example, to distinguish Bluetooth from BLE, the region in which the modulation index is 0.35 or less (Bluetooth) needs to be distinguished from the region in which the modulation index is 0.45 or more (BLE). When the threshold used to make this distinction is set to 0.4, error determinations are made in the region in which the modulation index is 0.4 or more.

In the example in FIG. 16, when the frequency deviation is 50 kHz or more, some error determinations are caused. While the frequency deviation range is set up to 115 kHz in the example in FIG. 16, when the allowable upper limit of the frequency deviation defined by a radio standard is larger, the probability of an error determination increases even more.

The radio analysis apparatus 100 according to the first variation acquires a value of frequency deviation from a known signal (for example, PREAMBLE in FIG. 3 or 4) and corrects the frequency deviation by using the value. Namely, the radio analysis apparatus 100 according to the first variation further includes functions of a deviation correction unit 116, as illustrated in FIG. 16. The deviation correction unit 116 acquires a value of frequency deviation from a known signal of an RF signal and corrects the frequency used for modulation by using the value.

With the above correction, since the bit sequence restoration unit 114 restores the bit sequence more accurately, and the modulation index calculation unit 115 selects a more correct correction value W, the phase shift amount reference value $X_{mod}$ is accurately calculated. As a result, the accuracy of the estimation of the modulation index is further improved.

(Second Variation: Determination of Incoming Wave)

Figure 17:
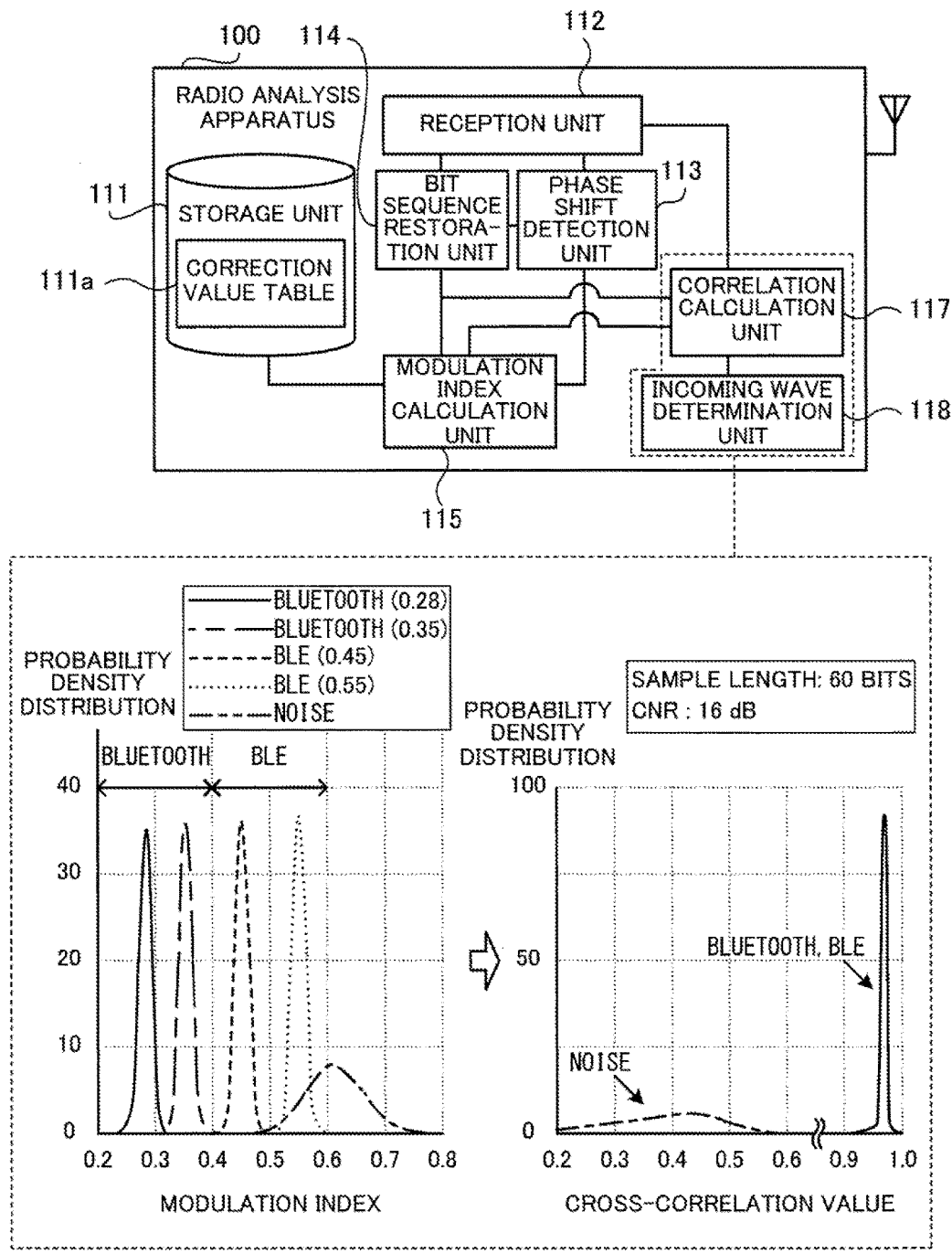
FIG. 17 illustrates functions of a radio analysis apparatus according to a second variation (determination of incoming waves) of the second embodiment.

Next, a second variation of the second embodiment will be described with reference to FIG. 17. FIG. 17 illustrates functions of a radio analysis apparatus according to a second variation (determination of an incoming wave) of the second embodiment.

The above description has been made on processing performed when the radio analysis apparatus 100 receives an RF signal (an FSK signal) generated on the basis of FSK. However, in practice, there are cases in which the radio analysis apparatus 100 receives an RF signal (a noise signal) generated on the basis of a different modulation method. In addition, when a modulation index is calculated from a noise signal by applying the technique according to the second embodiment, the modulation index could fall within the modulation index range used by a certain radio standard.

FIG. 17 illustrates modulation index probability density distributions calculated from FSK signals when the modulation method is GFSK and the modulation indexes are 0.28, 0.35, 0.45, and 0.55 (corresponding to Bluetooth and BLE) and a modulation index probability density distribution calculated from a noise signal. In FIG. 17, the modulation index range of BLE (between 0.45 and 0.55) includes the modulation index probability density distribution calculated from the noise signal. Thus, there is a risk that the noise signal could erroneously be determined to be an FSK signal of BLE.

Thus, the radio analysis apparatus 100 according to the second variation excludes a noise signal by using a cross-correlation value between an FSK signal (a reproduced signal) reproduced on the basis of an estimated modulation index and an actually received signal. As illustrated in FIG. 17, the radio analysis apparatus 100 according to the second variation further includes a correlation calculation unit 117 and an incoming wave determination unit 118.

By using FSK as the modulation method and on the basis of the modulation index calculated by the modulation index calculation unit 115, the correlation calculation unit 117 modulates the bit sequence restored by the bit sequence restoration unit 114 and generates an RF signal (a reproduced signal). For example, the correlation calculation unit 117 selects a correction value $W_n$ (n=1, 2, . . . ) from the correction value table 111a on the basis of a bit pattern of the restored bit sequence and generates a reproduced signal $\exp[jX_{mod}W_n]$ (j is an imaginary unit) by using the calculated modulation index (reference value) $X_{mod}$.

The correlation calculation unit 117 calculates a cross-correlation value between the RF signal received by the reception unit 112 and the reproduced signal generated. As is clear from the probability density distribution of the cross-correlation value illustrated in FIG. 17, when the received RF signal is an FSK signal (an RF signal of Bluetooth or BLE), the cross-correlation value is close to 1.0. In contrast, when the received RF signal is a noise signal, the cross-correlation value is sufficiently smaller than 1.0 (for example, 0.8 or less).

When the cross-correlation value calculated by the correlation calculation unit 117 is less than a threshold (for example, 0.8), the incoming wave determination unit 118 determines that the incoming wave (the received RF signal) is a noise signal. In contrast, when the cross-correlation value is equal to or more than the threshold, the incoming wave determination unit 118 determines that the incoming wave is an FSK signal. When the incoming wave is determined to be a noise signal, the modulation index calculated by the modulation index calculation unit 115 is not outputted. In this way, by excluding a noise signal, the radio standard is determined accurately.

(Others: Bit Length Used for Estimation)

When a longer bit sequence is used to estimate a modulation index, better estimation accuracy is obtained. When a modulation index is estimated on the basis of phase shift amounts extracted from portions corresponding to particular bit patterns in an RF signal, as the probability that such a particular bit pattern appears in one packet is low and the length of the bit sequence used for the estimation is shortened, it may be difficult to obtain sufficient estimation accuracy. In contrast, when estimating a modulation index, the above radio analysis apparatus 100 is able to use all the bit sequences indicated by a baseband signal, regardless of the bit pattern. Namely, the radio analysis apparatus 100 is able to estimate a modulation index more accurately.

However, if the length of the bit sequence used to estimate a modulation index is too long, the load on the estimation processing is also increased. Thus, in view of the load status of the radio analysis apparatus 100 or the like, the length of the bit sequence used to estimate a modulation index may be set to an upper limit value or less. For example, the shortest packet length defined by a radio standard or the packet length obtained from header information may be used as the upper limit value. For example, 68 bits, which is the shortest packet length of Bluetooth, or 80 bits, which is the shortest packet length of BLE, may be used as the upper limit value.

As described above, various kinds of variations or bit length settings may be applied to the radio analysis apparatus 100. It is needless to say that these variations and settings fall within the technical range of the second embodiment. In addition, the above first and second variations may be combined with each other. For example, the radio analysis apparatus 100 may include all the deviation correction unit 116, the correlation calculation unit 117, and the incoming wave determination unit 118. Such a combination of variations also falls within the technical range of the second embodiment.

[2-4. Flow of Processing]

Figure 18:
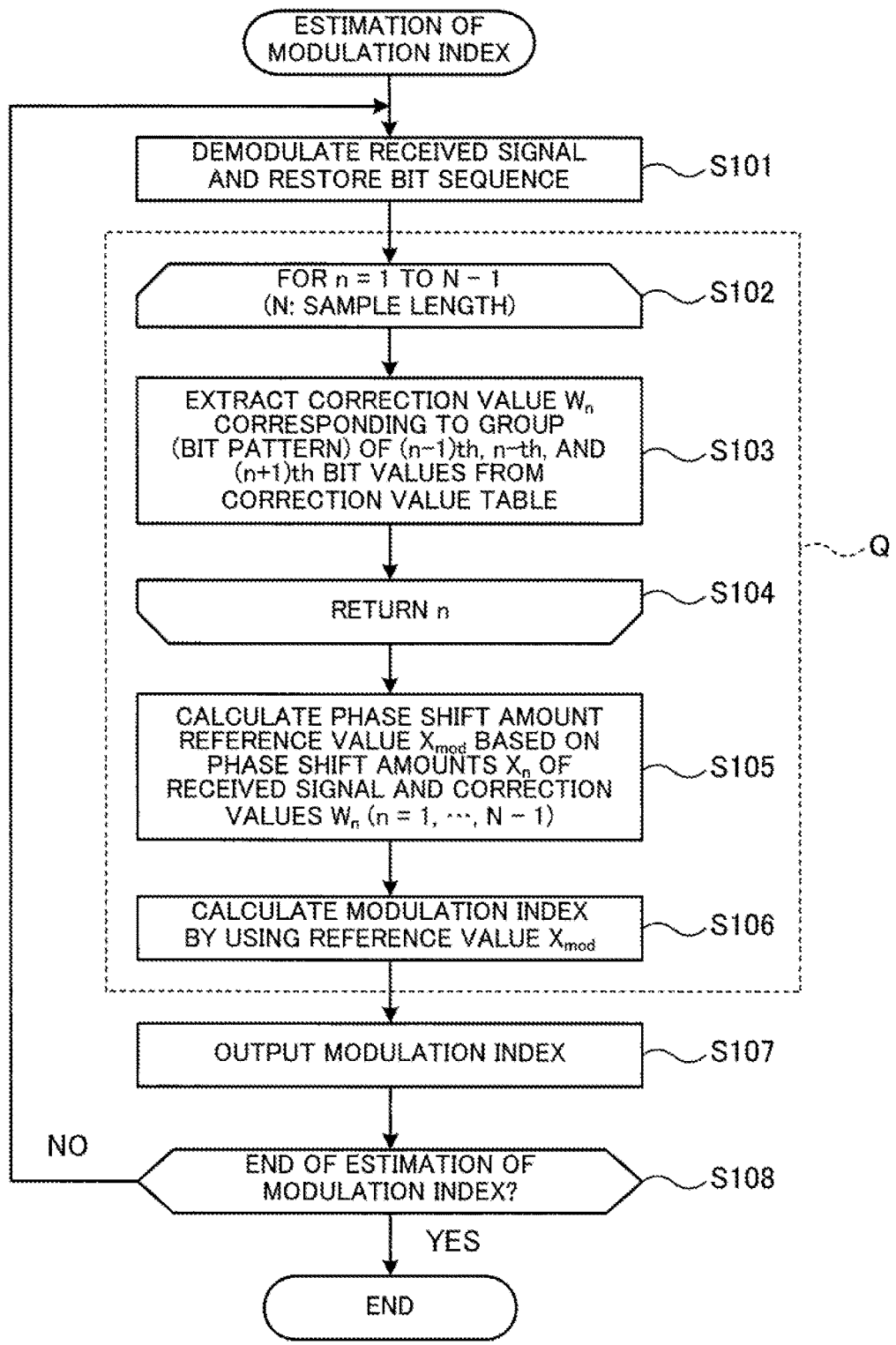
FIG. 18 is a flowchart illustrating the modulation index estimation method according to the second embodiment.

Next, a flow of processing performed by the radio analysis apparatus 100 will be described with reference to FIG. 18. The processing is about a method of estimating a modulation index according to the second embodiment. FIG. is a flowchart illustrating a method of estimating a modulation index according to the second embodiment.

(S101) The phase shift detection unit 113 detects phase shift amounts from an RF signal (a received signal) received by the reception unit 112. In addition, the bit sequence restoration unit 114 demodulates the baseband signal from the received signal by using the phase shift amounts detected by the phase shift detection unit 113 and restores the original bit sequence. For example, the bit sequence restoration unit 114 restores the original bit sequence on the basis of the plus and minus signs of the phase shift amounts.

The following description assumes that the length (sample length) of the restored bit sequence is (N+1) bits. In addition, the phase shift amount detected at the n-th sampling timing will be expressed as $X_n$ (n=0, 1, . . . , N). In addition, the phase shift amount reference value used to calculate the modulation index will be expressed as $X_{mod}$.

(S102, S104) The modulation index calculation unit 115 repeats step S103 while changing n from 1 to N−1.

(S103) The modulation index calculation unit 115 selects the (n−1)th bit value, the n-th bit value, and the (n+1)th bit value from the bit sequence restored by the bit sequence restoration unit 114. Next, the modulation index calculation unit 115 extracts a correction value $W_n$ corresponding to the selected group (bit pattern) of bit values from the correction value table 111a.

(S105) The modulation index calculation unit 115 calculates the phase shift amount reference value $X_{mod}$ on the basis of the phase shift amounts $X_n$ of the received signal and the correction values $W_n$ (n=1, . . . , N−1). For example, when a vector $X=(X_1, X_2, \ldots, X_{N-1})$ and a vector $W=(W_1, W_2, \ldots, W_{N-1})$ are used, the phase shift amount reference value $X_{mod}$ is expressed by the aforementioned expression (2). Namely, the modulation index calculation unit 115 calculates the phase shift amount reference value $X_{mod}$ on the basis of the above expression (2).

(S106, S107) The modulation index calculation unit 115 calculates the modulation index by using the phase shift amount reference value $X_{mod}$ calculated in S105. When the sampling timing of the individual phase shift amount $X_n$ is equal to the symbol rate and when the phase shift amount reference value is the maximum value of the phase shift amount, the modulation index is expressed as $X_{mod}/\pi$. Thus, the modulation index calculation unit 115 outputs $X_{mod}/\pi$ as the modulation index. The modulation index is outputted to the display 107, for example.

(S108) The modulation index calculation unit 115 determines whether to end the estimation of the modulation index. If the modulation index calculation unit 115 ends the estimation of the modulation index, the processing proceeds to END in FIG. 18. Otherwise, the processing returns to S101.

(Variation: Correction of Deviation and Determination of Incoming Wave)

Figure 19:
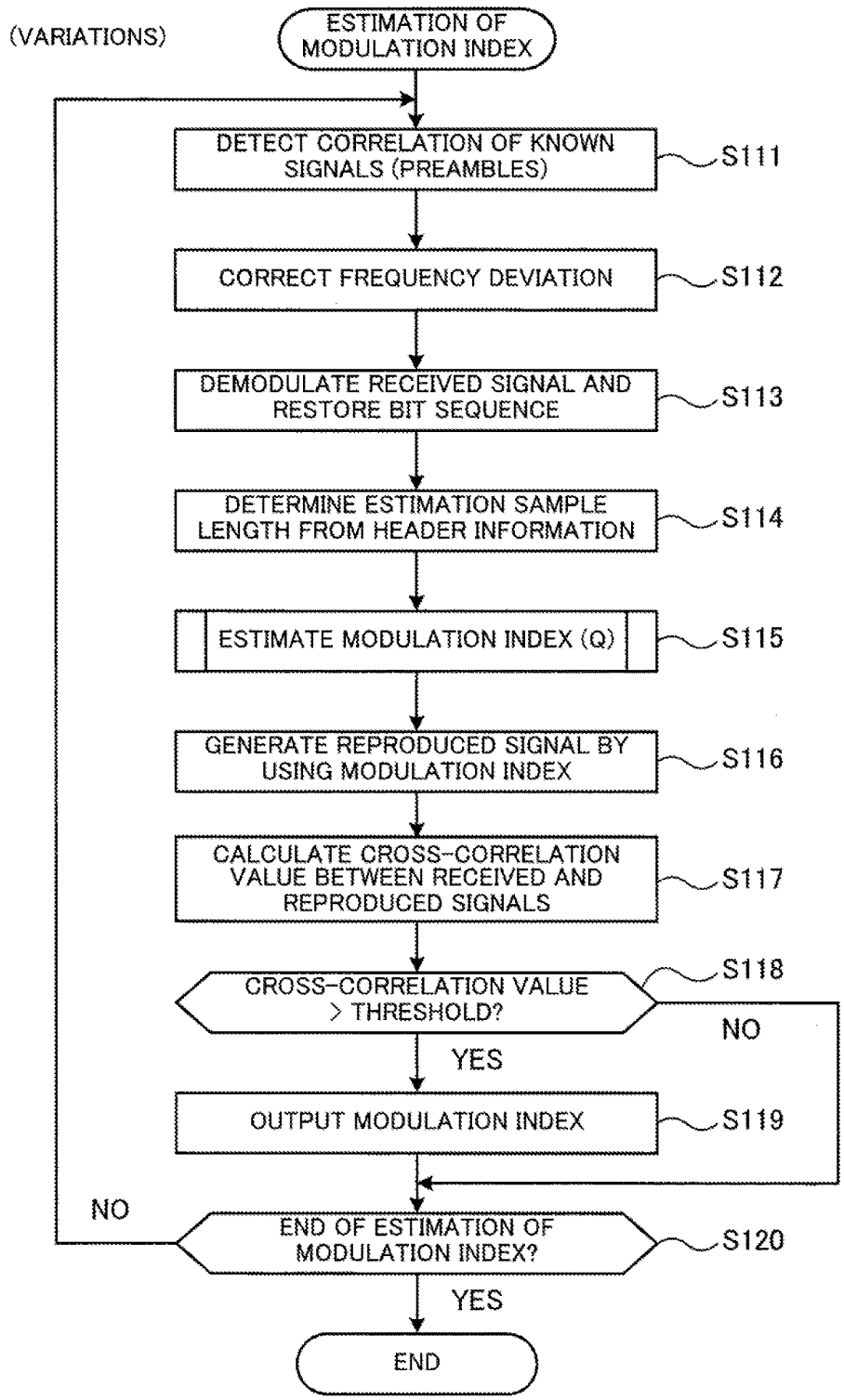
FIG. 19 is a flowchart illustrating a modulation index estimation method according to the variations (correction of deviation and determination of incoming waves) of the second embodiment.

When variations such as the above correction of the frequency deviation (first variation) or the above determination of the incoming wave (second variation) are applied, the flow of processing about the estimation of a modulation index is changed as illustrated in FIG. 19. FIG. 19 is a flowchart illustrating a method of estimating a modulation index according to the above variations (correction of deviation and determination of an incoming wave) of the second embodiment.

(S111, S112) The deviation correction unit 116 detects correlation of known signals (preambles). For example, the deviation correction unit 116 generates a known signal with the frequency used for the demodulation and acquires a value of frequency deviation from the correlation between the generated known signal and the received known signal. Next, the deviation correction unit 116 corrects the frequency used for the demodulation by using the acquired value.

(S113) The phase shift detection unit 113 detects phase shift amounts from the RF signal (the received signal) received by the reception unit 112. In addition, the bit sequence restoration unit 114 demodulates the baseband signal from the received signal by using the phase shift amounts detected by the phase shift detection unit 113 and restores the original bit sequence. For example, the bit sequence restoration unit 114 restores the original bit sequence on the basis of the plus and minus signs of the phase shift amounts.

(S114, S115) The modulation index calculation unit 115 determines the estimation sample length from header information included in the received signal. The modulation index calculation unit 115 may use the shortest packet length defined by a radio standard as the sample length. For example, 68 bits, which is the shortest packet length of Bluetooth, or 80 bits, which is the shortest packet length of BLE, may be used as the sample length. Next, the modulation index calculation unit 115 performs processing indicated by a reference character Q in FIG. 18.

(S116, S117) By using FSK as the modulation method and on the basis of the modulation index calculated by the modulation index calculation unit 115, the correlation calculation unit 117 modulates the bit sequence restored by the bit sequence restoration unit 114 and generates an RF signal (reproduced signal).

For example, the correlation calculation unit 117 selects a correction value $W_n$ (n=1, 2, . . .) from the correction value table 111a on the basis of a bit pattern of the restored bit sequence and generates a reproduced signal $\exp[jX_{mod}W_n]$ (j is an imaginary unit) by using the calculated modulation index (reference value) $X_{mod}$.

Next, the correlation calculation unit 117 calculates a cross-correlation value between the received signal and the reproduced signal.

(S118) The incoming wave determination unit 118 determines whether the cross-correlation value calculated by the correlation calculation unit 117 is larger than a threshold (for example, 0.8). The threshold is set in advance. When the cross-correlation value is larger than the threshold, the processing proceeds to S119. Otherwise, the processing proceeds to S120.

(S119) The modulation index calculation unit 115 outputs the calculated modulation index to the display 107 or the like.

(S120) The modulation index calculation unit 115 determines whether to end the estimation of the modulation index. When the modulation index calculation unit 115 ends the estimation of the modulation index, the processing proceeds to END in FIG. 19. Otherwise, the processing returns to S111.

(Application)

Figure 20:
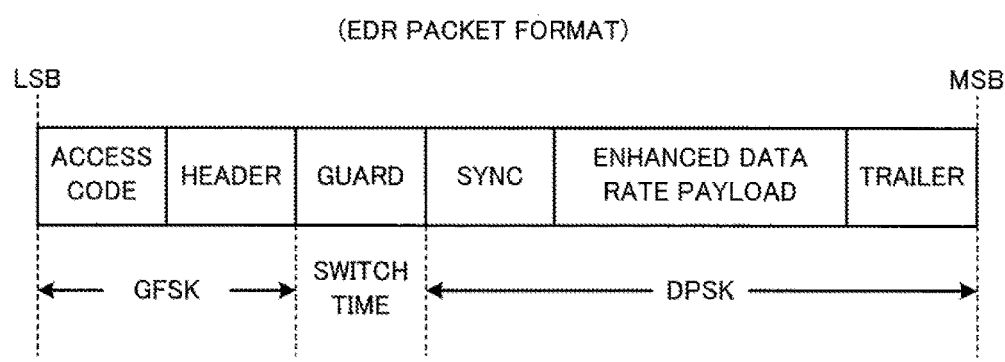
FIG. 20 illustrates an example of an enhanced data rate (EDR) packet format.

The technique according to the second embodiment is suitably applicable to a specification in which the modulation method changes during processing, such as to a specification used for an enhanced data rate (EDR) packet (see FIG. 20). FIG. 20 illustrates an example of an EDR packet format.

In the case of an EDR packet, ACCESS CODE and HEADER are modulated on the basis of GFSK. However, after GUARD, which is the modulation method switch time, SYNC and the subsequent areas are modulated on the basis of DPSK. Namely, the period that may be used to estimate the modulation index (the period in which the modulation on the basis of GFSK is performed) is short. However, by applying the technique according to the second embodiment, all the bit sequences in the short period are used to estimate the modulation index. Thus, the modulation index is estimated with allowable estimation accuracy.

For convenience of description, the above description has been made by using Bluetooth and BLE as examples. However, the technique according to the second embodiment is also applicable to, for example, ANT and ANT+, which are near-field communication protocols of an ultra-low power consumption type.

The second embodiment has thus been described.

According to one aspect of the embodiments and the variations discussed above, the proposed techniques improve the accuracy of estimation of a modulation index.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio analysis apparatus comprising:
a processor that calculates a modulation index of a radio signal generated by performing frequency shift keying on a baseband signal, based on phase shift amounts of the radio signal; and
a memory that holds information in which bit patterns of the baseband signal are associated with correction values for correcting the phase shift amounts that have dropped by band limitation on the baseband signal,
wherein the processor restores the bit patterns of the baseband signal based on the phase shift amounts of the radio signal, corrects the phase shift amounts of the radio signal by using the correction values corresponding to the restored bit patterns, and calculates the modulation index based on the corrected phase shift amounts.

2. The radio analysis apparatus according to claim 1,
wherein the memory holds the correction values corresponding to all the bit patterns in a predetermined length of bit sequence, and
wherein the processor corrects phase shift amounts of the radio signal corresponding to a bit sequence with a preset bit length in a bit sequence of the baseband signal by using the correction values and calculates the modulation index based on the corrected phase shift amounts.

3. The radio analysis apparatus according to claim 1,
wherein the correction values are calculated based on a kind and a tap coefficient of a filter used for the band limitation on the baseband signal.

4. The radio analysis apparatus according to claim 1,
wherein the processor calculates a sum of products of the individual phase shift amounts and the individual correction value, calculates a sum of squares of the individual correction value used to calculate the sum of products, and divides the sum of products by the sum of squares, and
wherein the processor calculates the modulation index, assuming that a value obtained by the division is the individual phase shift amounts when the band limitation is not performed.

5. A radio analysis method performed by a radio analysis apparatus including a memory and a processor which calculates a modulation index of a radio signal generated by performing frequency shift keying on a baseband signal, based on phase shift amounts of the radio signal, the radio analysis method comprising:
acquiring, by the processor, information in which bit patterns of the baseband signal are associated with correction values for correcting the phase shift amounts that have dropped by band limitation on the baseband signal from the memory; and
restoring, by the processor, the bit patterns of the baseband signal based on the phase shift amounts of the radio signal, correcting the phase shift amounts of the radio signal by using the correction values corresponding to the restored bit patterns, and calculating the modulation index based on the corrected phase shift amounts.

6. A non-transitory computer-readable storage medium storing a computer program that causes a computer having a memory and a processor which calculates a modulation index of a radio signal generated by performing frequency shift keying on a baseband signal, based on phase shift amounts of the radio signal to perform a procedure comprising:
acquiring information in which bit patterns of the baseband signal are associated with correction values for correcting the phase shift amounts that have dropped by band limitation on the baseband signal from the memory; and
restoring the bit patterns of the baseband signal based on the phase shift amounts of the radio signal, correcting the phase shift amounts of the radio signal by using the correction values corresponding to the restored bit patterns, and calculating the modulation index based on the corrected phase shift amounts.

* * * * *